(12) United States Patent
Maguire

(10) Patent No.: US 12,464,377 B2
(45) Date of Patent: Nov. 4, 2025

(54) UPDATING RECORD OF BORDER CELLS

(71) Applicant: Telefonaktiebolaget LM Ericsson (PUBL), Stockholm (SE)

(72) Inventor: Patrick Maguire, Athlone (IE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 850 days.

(21) Appl. No.: 17/603,037

(22) PCT Filed: Apr. 12, 2019

(86) PCT No.: PCT/EP2019/059572
§ 371 (c)(1),
(2) Date: Oct. 12, 2021

(87) PCT Pub. No.: WO2020/207606
PCT Pub. Date: Oct. 15, 2020

(65) Prior Publication Data
US 2022/0191716 A1 Jun. 16, 2022

(51) Int. Cl.
H04W 24/02 (2009.01)
H04W 48/16 (2009.01)

(52) U.S. Cl.
CPC .......... H04W 24/02 (2013.01); H04W 48/16 (2013.01)

(58) Field of Classification Search
CPC .......... H04W 24/02; H04W 36/00835; H04W 48/16
USPC ........................................................ 370/329
See application file for complete search history.

(56) References Cited

U.S. PATENT DOCUMENTS

2014/0355463 A1* 12/2014 Smith .................. H04W 36/14
370/252
2015/0093996 A1* 4/2015 Ghaboosi ............. H04W 24/02
455/67.11

FOREIGN PATENT DOCUMENTS

| CN | 101437217 A | 5/2009 |
| GB | 2550826 A1 | 11/2017 |
| WO | 2016 153984 A1 | 9/2016 |
| WO | WO2018130279 A1 | 7/2018 |
| WO | 2019 048048 A1 | 3/2019 |

OTHER PUBLICATIONS

Office Action issued for Chinese Patent Application Serial No. 201980097364.7—Dec. 16, 2023.
Search Report issued for Chinese Patent Application Serial No. 2019800973647—Dec. 15, 2023.
3GPP TS 23.501 v0.0.0; Technical Specification; 3rd Generation Partnership Project; Technical Specification Group Services and System Aspects; System Architecture for the 5G System; Stage 2; (Release 15)—Jan. 2017.
ETSI TS 128 541 v15.0.1; Technical Specification; 5G; Management and orchestration; 5G Network Resource Model (NRM); Stage 2 and stage 3 (3GPP TS 28.541 version 15.0.1 Release 15)—Oct. 2018.

(Continued)

Primary Examiner — Christopher R Crompton
(74) Attorney, Agent, or Firm — Baker Botts L.L.P.

(57) ABSTRACT

A network node in a cellular communication network maintains a record of border cells of network slices. A change in the cells active in the network is then determined. The record of border cells of network slices is then updated based on said change in the cells active in the network.

17 Claims, 17 Drawing Sheets

(56) References Cited

OTHER PUBLICATIONS

PCT Notification of Transmittal of the International Search Report and the Written Opinion of the International Searching Authority, or the Declaration issued for Internatinoal application No. PCT/EP2019/059572—Dec. 16, 2019.
Rachid El Hattachi et al., A Deliverable by the NGMN Alliance, Ngmn 5G White Paper; Version 1.0—Feb. 17, 2015.
Notice of Second Review issued for Chinese Patent Application No. 201980097364.7—Apr. 7, 2024.

* cited by examiner

UPDATING RECORD OF BORDER CELLS

PRIORITY

This nonprovisional application is a U.S. National Stage Filing under 35 U.S.C. § 371 of International Patent Application Serial No. PCT/EP2019/059572 filed Apr. 12, 2019 and entitled "UPDATING RECORD OF BORDER CELLS" which is hereby incorporated by reference in its entirety.

TECHNICAL FIELD

This relates to updating a record of border cells of network slices, and in particular to updating a record of border cells of network slices in response to a change in the cells active in a network.

BACKGROUND

An architecture for a wireless communications network, which may be referred to as the 5G system, or as the Next Generation Radio (NR) network, is defined in the document 3GPP TS 23.501 V15.3.0.

This defines a cellular network, and also defines the concept of network slicing, as a mechanism to provide improved service to users. A network slice comprises a portion of the available network resources. A network slice is identified by a Single Network Slice Selection Assistance Information (S-NSSAI), which includes a Slice/Service type (SST), which refers to the expected Network Slice behaviour in terms of features and services; and may also include a Slice Differentiator (SD), which is optional information that complements the Slice/Service type(s) to differentiate amongst multiple Network Slices of the same Slice/Service type.

In the defined cellular network, the finest granularity of service area restriction is a Tracking Area (TA), where a Tracking Area contains one or (usually) more than one cell. This implies that the minimal coverage of any slice is one Tracking Area (TA). In management and orchestration systems which deploy network slices, based on service request received, the orchestration & management system must among other tasks determine what is the coverage requirement associated in the service request. The outcome will be a defined set of one or more tracking areas. The network will then be configured to associate the deployed Network (NW) Slice with the identified tracking areas. The configured TA(s) define the area within which user equipment or other devices associated with the NW Slice are restricted, mobility wise for access to the supported service(s) in the NW Slice.

As mentioned above, a tracking area is a logical entity representing the aggregation of one or many cells. While cells in certain scenarios (e.g. indoor deployments, or Narrow Band Internet of Things (NB-IoT)) could be a dedicated to one NW slice, for the majority of outdoor scenarios, the logical cell and its associated physical radio resources are shared, and are not dedicated to one NW slice.

Therefore, the resources of a tracking area (and its associated cells) will be shared by those devices which are permitted access to services in all deployed NW slices requiring this coverage (i.e. devices which have full network coverage service), and possibly by those devices that are not associated to any particular NW slice (i.e. devices not authorized to use services on any of the NW slices).

The document 3GPP TS 38.300 V15.3.0 sets out some key points related to network slicing, namely:

Resource Management Between Slices

The Next Generation Radio Access Network (NG-RAN) supports policy enforcement between slices as per service level agreements. It should be possible for a single NG-RAN node to support multiple slices. The NG-RAN should be free to apply the best RRM policy for the service level agreement (SLA) in place to each supported slice.

Resource Isolation between Slices

The NG-RAN supports resource isolation between slices. NG-RAN resource isolation may be achieved by means of RRM policies and protection mechanisms that should avoid that shortage of shared resources in one slice breaks the service level agreement for another slice. It should be possible to fully dedicate NG-RAN resources to a certain slice. How NG-RAN supports resource isolation is implementation dependent.

Slice Availability

Some slices may be available only in part of the network. Awareness in the NG-RAN of the slices supported in the cells of its neighbors may be beneficial for inter-frequency mobility in connected mode.

Granularity of Slice Awareness

Slice awareness in NG-RAN is introduced at PDU session level, by indicating the S-NSSAI corresponding to the Protocol Data Unit (PDU) Session, in all signalling containing PDU session resource information.

Mobility

To make mobility slice-aware in case of Network Slicing, S-NSSAI is introduced as part of the PDU session information that is transferred during mobility signaling. This enables slice-aware admission and congestion control.

In summary, key aspects in NR for NW Slicing include:
SLA compliance per slice using;
Enabling RRM policies and protection mechanisms
Enabling Inter-frequency mobility optimization
Enabling Admission and Congestion control optimization.

Certain optimizations can be achieved in admission, congestion and mobility by using slice aware mechanisms, such as mapping the slice S-NSSAI to supported TA(s) and their associated cells, and giving consideration to slice availability aspects, such as partial network coverage, overlapping slice coverage etc.

The optimization mechanisms discussed above fail to recognize that cells cannot all be treated the same. Specifically, these mechanisms fail to recognize that the policies and protection mechanisms that will be applied in the cells of a network slice can advantageously differ, depending on whether the cell is at the coverage boundary or not.

These above discussed challenges may be at least partially addressed through identifying cells which form part of the coverage boundary of a network slice. This helps to enable optimization of the radio network in areas such as admission, congestion, mobility and energy efficiency.

It will be appreciated that, in relation to changes in a radio deployment, there may be many driving factors for adding or for removing a cell from a network. For example, one of these factors may be the changing demands for network capacity. In one example, where there is network capacity growth, an existing cell in a network may experience growth in its traffic load. This may result in the effective coverage area of the cell decreasing. Additional cells may therefore be deployed within the network, in response to the network capacity growth, in order to prevent the appearance in the network of areas with no coverage (which may be referred to as "white spots").

Two examples of factors from a radio perspective which determine the need to either add or remove a Tracking Area to (from) a network, or which determine the need to amend a number of sites or cells included in a Tracking Area are:
  a. Tracking Area Update performance, which may result in a high signaling load or a low Tracking Area success rate, and
  b. Paging Performance, where it may be that the Tracking Area is large and this is causing discarded pages on the base station level. In these circumstances, a Tracking Area split may be required to improve paging performance.

Radio Optimizers/Planners will typically monitor these (and possibly additional) performance factors, and request Tracking Area design modifications once a need for a modification is identified. This may happen at any stage in a network lifecycle, and may also happen in a mature network.

In an operator's process, a radio design, or a radio optimization, team will typically trigger Tracking Area plan changes in a radio deployment. This will be completed via interaction with an Operations Support Systems (OSS) to complete the required re-configuration. It will also be appreciated that, for energy efficiency reasons, an operator may decide to lock cells at low traffic levels, which may result in a change in the radio coverage solution.

SUMMARY

Therefore, although the border cells at network slice deployment time can be identified, there still remains a post deployment time problem, where the radio deployment is changed due to, for example, increased capacity needs when nodes and/or cells are added to, or removed from, the network.

It is an aim of the present disclosure to provide a method, apparatus and computer readable medium which at least partially address one or more of the challenges discussed above.

According to a first aspect, there is provided a method of monitoring cells in a cellular communication network, the method comprising:
  maintaining a record of border cells of at least one network slice;
  determining a change in the cells active in the network; and
  updating said record of border cells of the at least one network slice based on said change in the cells active in the network.

According to another aspect, there is provided a network node for a cellular communication network, the network node comprising a processor and a memory, the memory containing instructions executable by the processor, wherein the memory is operative to:
  maintain a record of border cells of at least one network slice; and
  wherein the processor is operative to:
  determine a change in the cells active in the network; and
  update said record of border cells of at least one network slice based on said change in the cells active in the network.

According to a further aspect, there is provided a computer program product, comprising computer readable code, configured for causing a suitable programmed processor to perform a method according to the first aspect.

According to a still further aspect, there is provided a computer program product, comprising a tangible computer readable medium, containing computer readable instructions for causing a processor to perform a method comprising:
  maintaining a record of border cells of at least one network slice;
  determining a change in the cells active in the network; and
  updating said record of border cells of at least one network slice based on said change in the cells active in the network.

Thus, the border cells list of a radio network is able to self-maintain, regardless of changes in radio deployment, and this helps ensure that dependent radio algorithms, specifically mobility algorithms, are optimised correctly.

Further features of the present invention are as claimed in the dependent claims.

DETAILED DESCRIPTION

Figure 1:
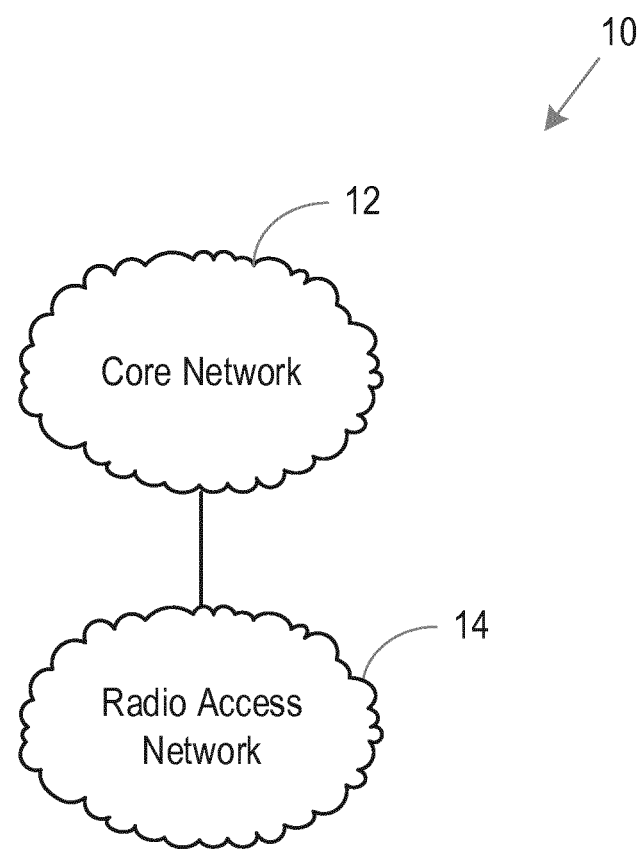
FIG. 1 is a schematic diagram of a wireless communications network.

FIG. 1 is a schematic diagram of a wireless communications network 10.

The network 10 may for example be a network that is referred to as a 5G network, or as a Next Generation Radio (NR) network, the architecture of which is defined in the document 3GPP TS 23.501 V15.3.0.

In very general terms, the network 10 includes a core network 12 and a radio access network 14.

The radio access network 14 includes physical radio nodes, which include transceivers that are able to communicate with wireless devices within their coverage areas. The wireless devices may be User Equipment (UE) devices such as smartphones or tablet computers, or they may be devices that automatically connect to the network such as tracking devices, and they may be mobile or may be stationary, for example in the form of remote sensing devices. When the term User Equipment (UE) device is used herein, it may refer to any wireless device that is able to communicate with the network.

Figure 2:
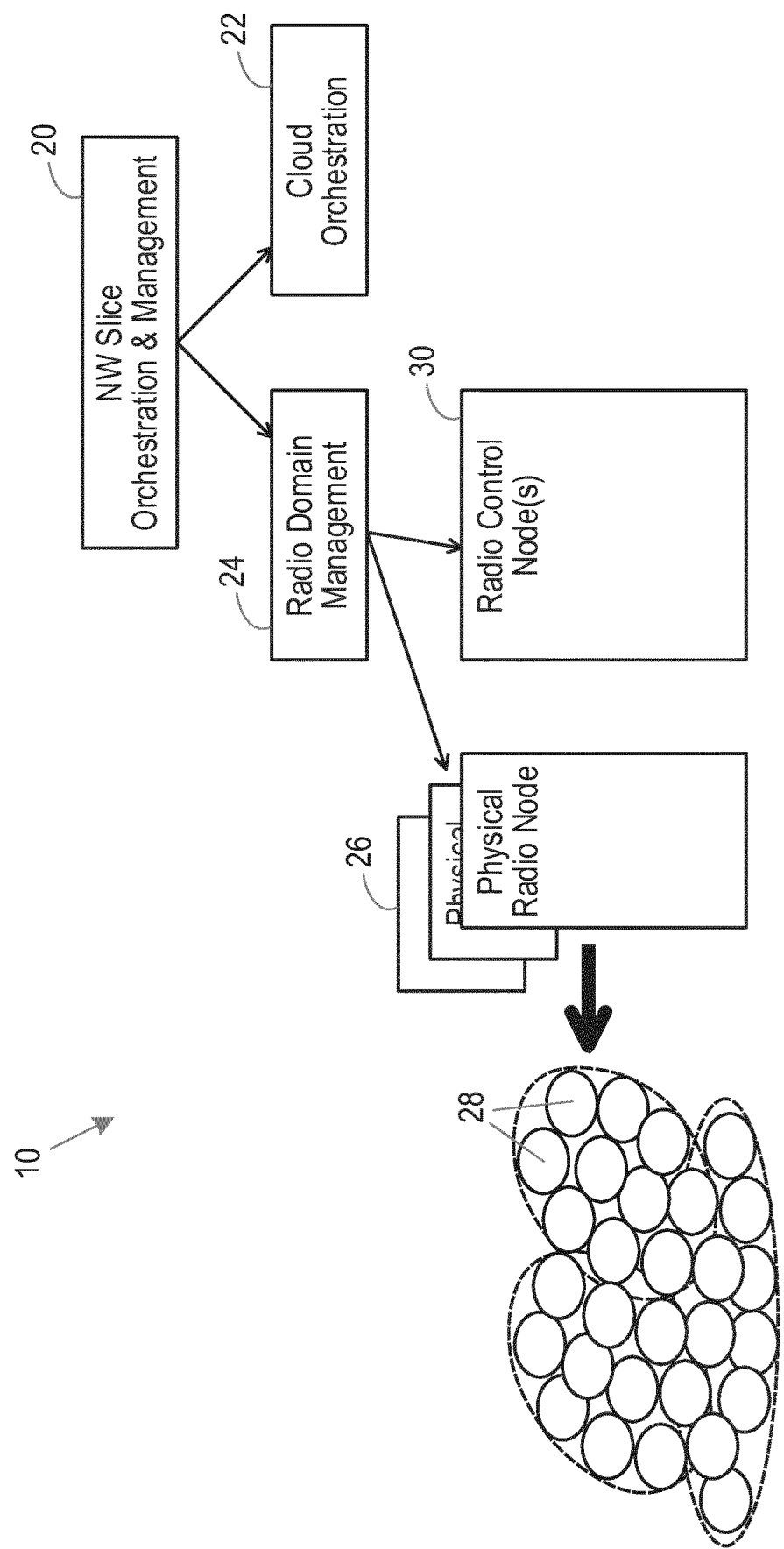
FIG. 2 illustrates one implementation of the wireless communications network.

FIG. 2 illustrates one implementation of the wireless communications network 10, and in particular shows the components of the network 10 that are used for the management and control of network slicing. Specifically, FIG. 2 shows the network 10 as including a network (NW) slice orchestration and management node 20. The NW slice orchestration and management node 20 deploys resources by means of a cloud orchestration node 22. Specifically, the cloud orchestration node 22 can orchestrate the network resources and the network slicing services.

FIG. 2 also shows the network 10 as including a radio domain management node 24, through which the network resources allocated for network slices are configured.

The radio access network of the network 10 includes multiple physical radio nodes 26, each of which provides service to one or more associated cells 28.

In a Long-Term Evolution (LTE) Physical Network Function (PNF) deployment, the physical radio nodes 26 are referred to as eNodeB's. In this case, the physical radio nodes 26 are preconfigured with various policies and control mechanisms, for example relating to admission, congestion control, mobility and energy efficiency. In a network as illustrated here, using network slicing, the physical radio nodes 26 are preconfigured with policies and control mechanisms to be applied to network slices.

In a Next Generation Radio (NR) deployment, the network 10 typically includes multiple Radio Control Nodes 30, hosting the radio control function (RCF), and the Radio Control Nodes are preconfigured with policies and control mechanisms, for example relating to admission, congestion control, mobility and energy efficiency, and these may include policies and control mechanisms to be applied specifically to network slices.

Figure 3:
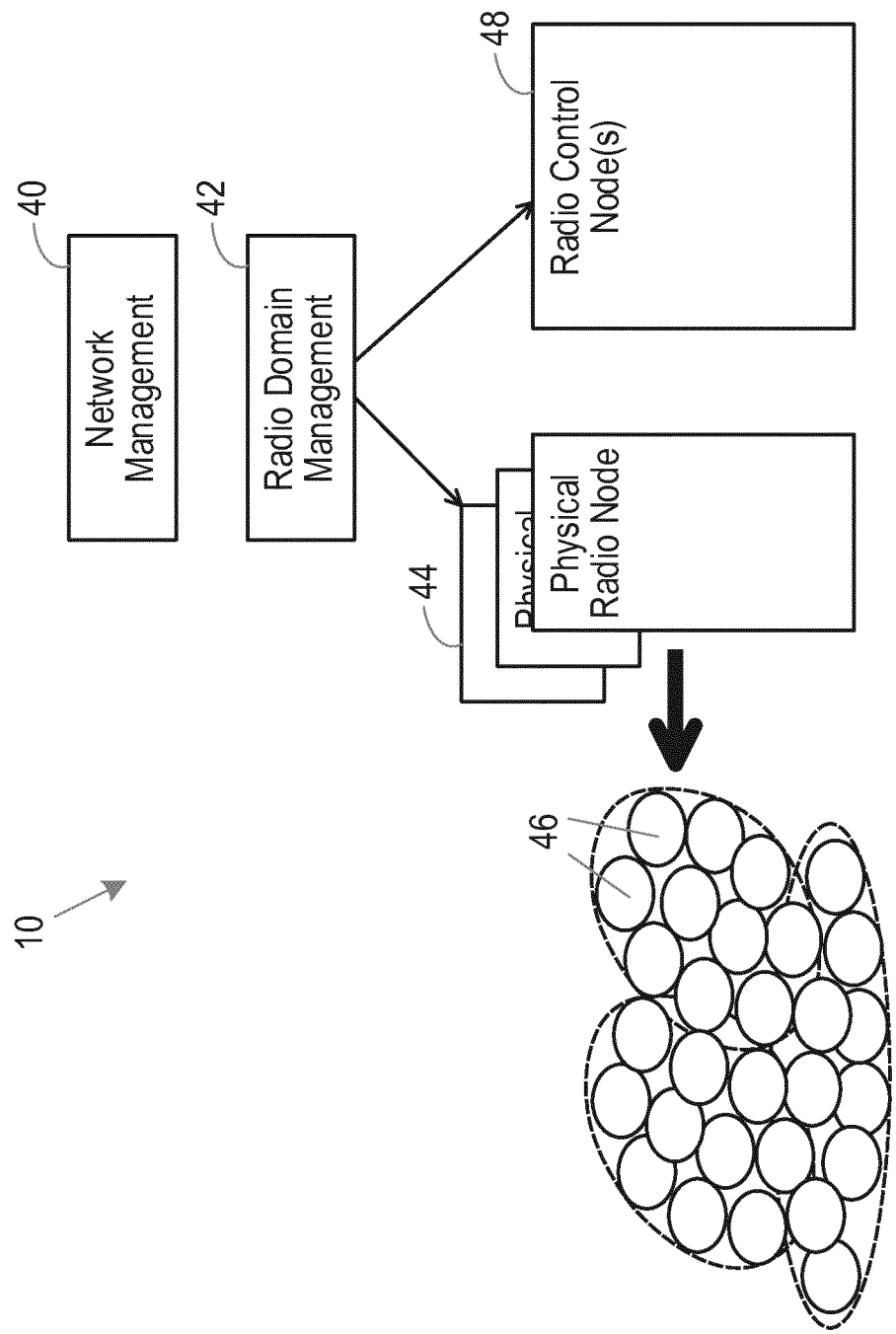
FIG. 3 illustrates a different implementation of the wireless communications network.

FIG. 3 illustrates an alternative implementation of the wireless communications network 10, and shows the components of the network 10 that are used for the management and control of network slicing in this implementation. Specifically, FIG. 3 shows the network 10 as including a network management node 40. The network management node 40 oversees a radio domain management node 42, through which the network resources allocated for network slices are configured.

The radio access network of the network 10 includes multiple physical radio nodes 44, each of which provides service to one or more associated cells 46.

In a Long-Term Evolution (LTE) Physical Network Function (PNF) deployment, the physical radio nodes 44 are referred to as eNodeB's. In this case, the physical radio nodes 44 are preconfigured with various policies and control mechanisms, for example relating to admission, congestion control, mobility and energy efficiency. In a network as illustrated here, using network slicing, the physical radio nodes 44 are preconfigured with policies and control mechanisms to be applied to network slices.

In a Next Generation Radio (NR) deployment, the network 10 typically includes multiple Radio Control Nodes 48, hosting the radio control function (RCF), and the Radio Control Nodes are preconfigured with policies and control mechanisms, for example relating to admission, congestion control, mobility and energy efficiency, and these may include policies and control mechanisms to be applied specifically to network slices.

In any of the implementations described with reference to FIG. 2 or FIG. 3, in order to deploy a NW slice, the required virtualized resources are first allocated and connected. All resources (both physical and virtual) are then configured to meet the service requirements associated with the specified service request which triggered the NW slice deployment. From a radio perspective, this implies that the required radio coverage is allocated and the associated radio resources are configured.

There is described herein an algorithm for determining which policies to apply to a network slice, and to UE devices that are being served by a cell that forms part of a network slice.

The algorithm may be deployed in any suitable node of the network. For example, in the network shown in FIG. 2, the algorithm may be deployed in the NW Slice orchestration and management node 20, or in the radio domain management node 24, or in each of the physical radio edge nodes 26, or in the or each Radio Control Node 30. Similarly, in the network shown in FIG. 3, the algorithm may be deployed in the network management node 40, in the radio domain management node 42, in each physical radio edge node 44, or in each Radio Control Node 48. Configuration related to the algorithm, either at system level or at cell level, will be controlled from and persisted in the radio domain management node 24, 42.

Figure 4:
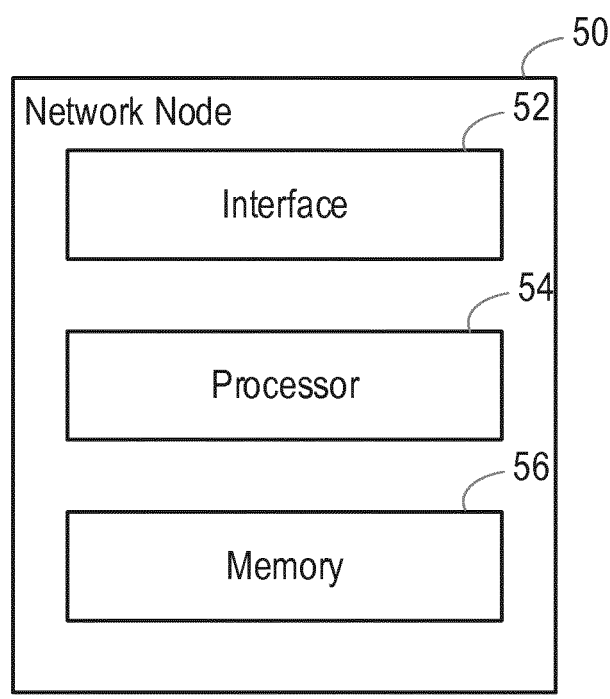
FIG. 4 is a schematic illustration of a network node.

FIG. 4 illustrates the general form of any of these nodes in which the algorithm may be deployed.

Specifically, the relevant network node 50 includes one or more interface(s) 52, which may be used to communicate with other network nodes and/or, in the case where the network node 50 is a physical radio node, with UE devices being served by the node.

The network node 50 also includes a processor 54, for performing the algorithm.

The network node 50 also includes a memory 56 for storing data, and for storing program instructions for causing the processor to perform the algorithm.

Figure 5:
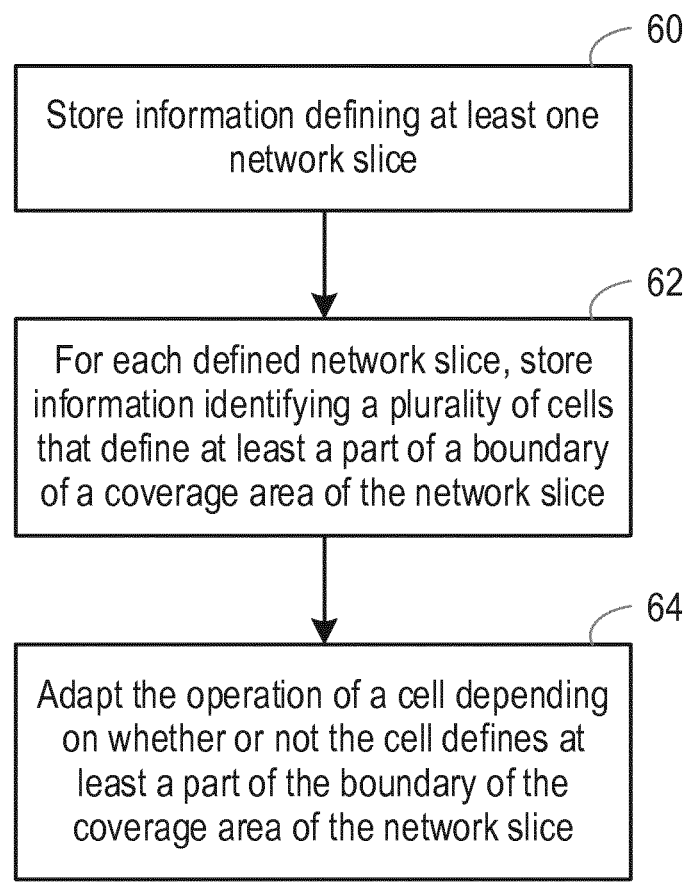
FIG. 5 is a flow chart, illustrating a method performed in a network node.

FIG. 5 is a flow chart, illustrating a method performed in a network node, for example at a time when the network is first deployed, or at a time when a new network slice is defined.

At step 60 of the method shown in FIG. 5, the network node stores information defining at least one network slice.

For example, the information that is stored may comprise information defining a slice type of each defined network slice.

In addition, the information that is stored may comprise information identifying the cells that define at least a part of the boundary of the coverage area of the network slice.

Figure 6:
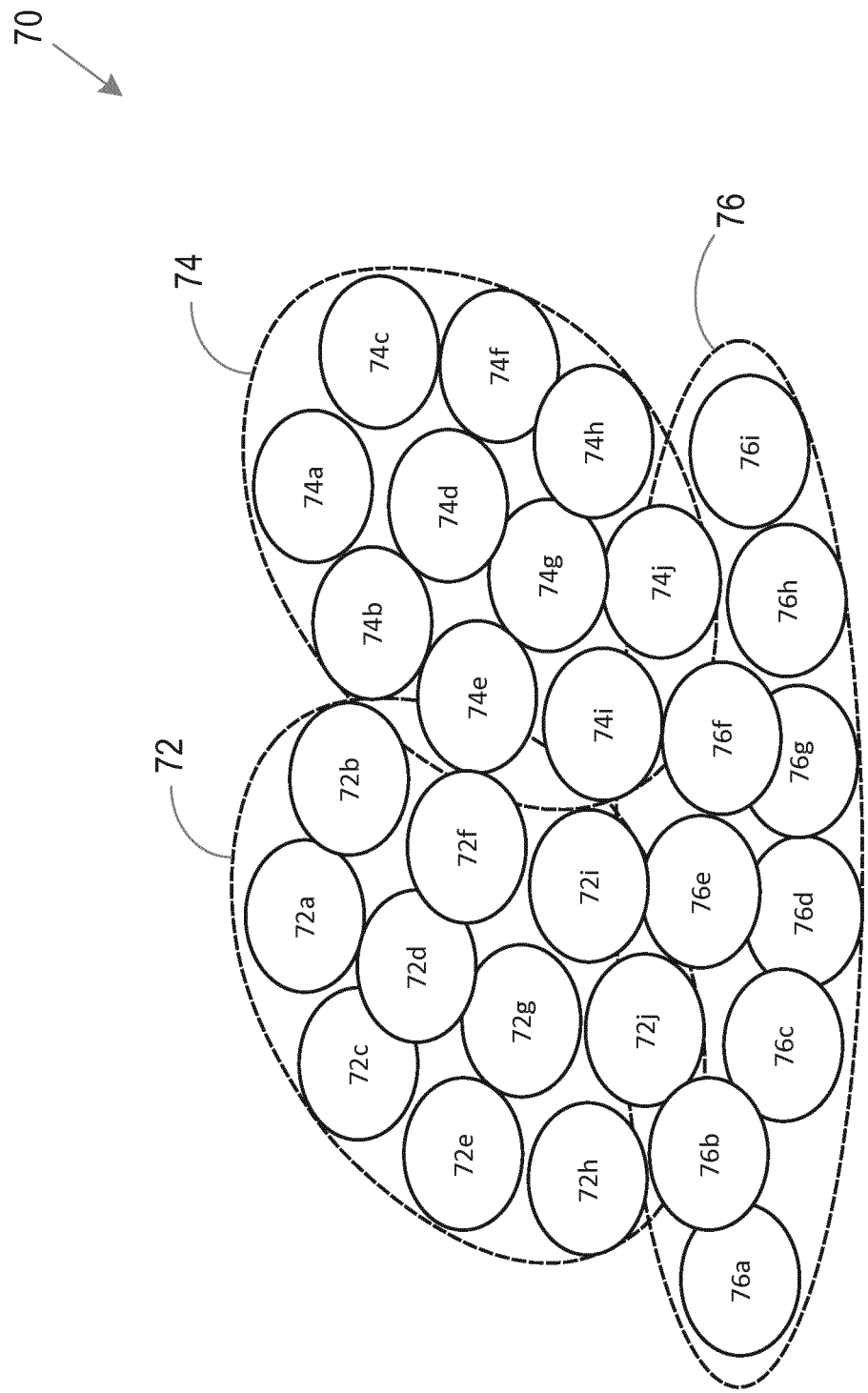
FIG. 6 illustrates cells, tracking areas, and network slices in the wireless communications network.

FIG. 6 illustrates a part of the network in which the method is deployed. Specifically, the network 70 includes multiple cells, each of which is served by a physical radio node, which is not shown in FIG. 5. The cells are divided into tracking areas (TA). Thus, in FIG. 6, three tracking areas 72, 74, 76 are shown. The tracking area 72 includes cells 72a, 72b, . . . , 72j; the tracking area 74 includes cells 74a, 74b, . . . , 74j; and the tracking area 76 includes cells 76a, 76b, . . . , 76i.

In this illustrated embodiment, three network slices are defined. A first network slice covers tracking areas 72, 74; a second network slice covers tracking areas 74, 76; and a third network slice covers tracking areas 72, 76.

Information about each slice is stored in the relevant network node(s). This information may for example indicate the cells and or tracking area(s) that make up the slice. In addition, the information that is stored about the slice may include an indication of the slice type. For example, some slices may be configured in such a way that they provide a high bandwidth (for example for streaming mobile entertainment services), while other slices may be defined in such a way that they provide an ultra-reliable connection.

In addition, a preliminary algorithm may be enabled or disabled. The preliminary algorithm provides information to be stored and used in the method of FIG. 5. As described in more detail below, the method of FIG. 5 distinguishes between the cells that define the boundary of a network slice, and the cells that are not part of the boundary of the network slice.

In order to identify the cells that define the boundary, the neighbour lists of the cells in the network slice may be used. Specifically, in this one embodiment, for a plurality of individual cells in the coverage area of the network slice, the neighbour cell list of that individual cell is compared against the full list of cells in the coverage area of the network slice. If one or more cell appearing in the neighbour cell list does not appear in the list of cells in the coverage area of the network slice, it may be determined that that cell defines at least a part of the boundary of the coverage area of the network slice. In some embodiments, the steps of (a) comparing the neighbour cell list of the individual cell against the full list of cells in the coverage area of the network slice and (b) determining that that individual cell defines at least a part of the boundary of the coverage area of the network slice if one or more cell appearing in the neighbour cell list does not appear in the list of cells in the coverage area of the network slice, are performed for each individual cell in the coverage area of the network slice.

Figure 7:
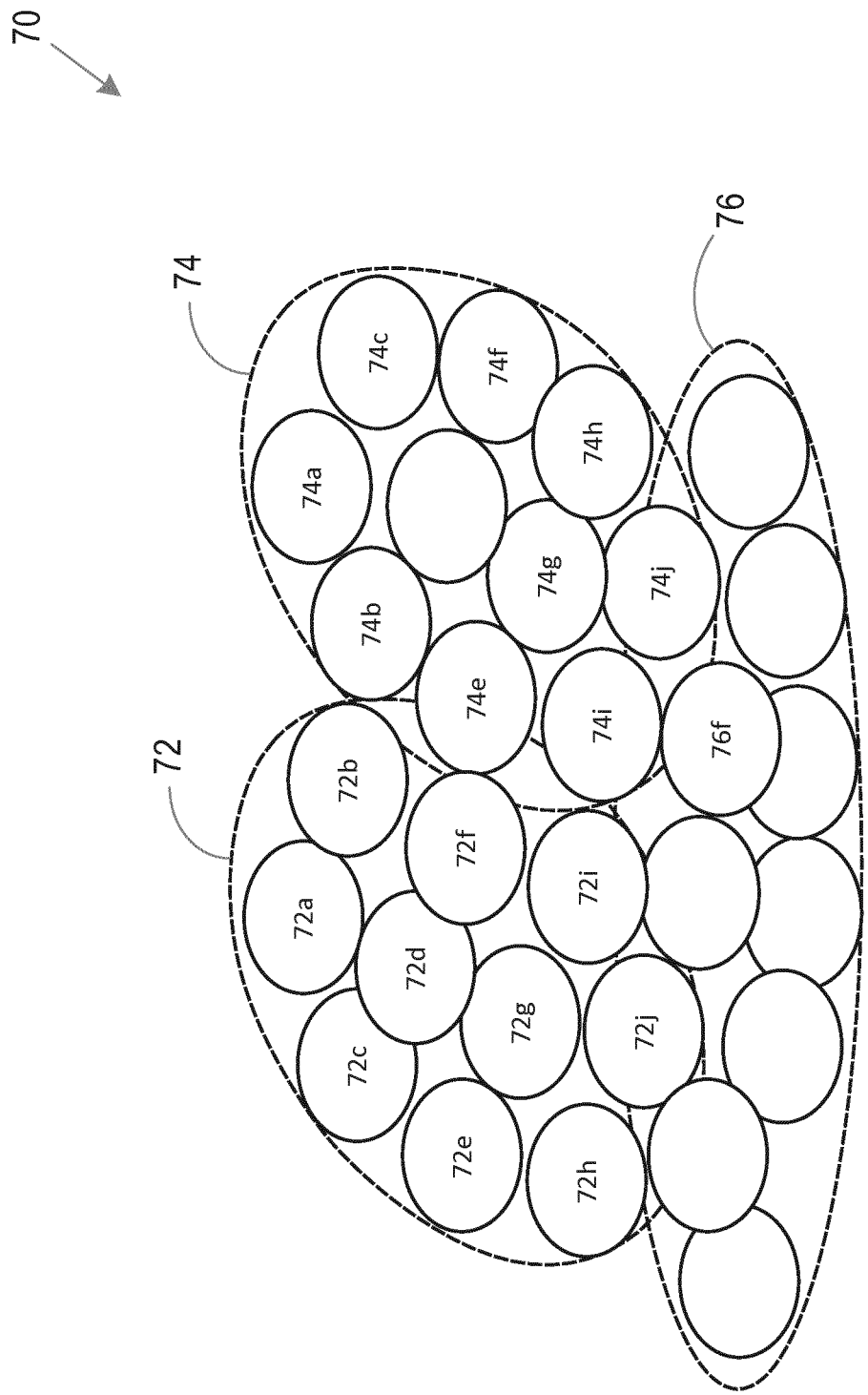
FIG. 7 further illustrates cells, tracking areas, and network slices in the wireless communications network.

This is illustrated with reference to FIG. 7. Specifically, FIG. 7 shows a situation where the network slice that is under consideration is the network slice that is made up of the tracking areas 72, 74.

Firstly, by way of illustration, the cell 72*f* is considered. The neighbour list of cell 72*f* includes the cells 72*b*, 72*d*, 72*g*, 72*i*, 74*e*, and 74*i*. All of these cells in the neighbour cell list of cell 72*f* appear in the list of cells in the coverage area of the network slice, and so it may be determined that the cell 72*f* does not define a part of the boundary of the coverage area of the network slice.

Then, by way of further illustration, the cell 74*i* is considered. The neighbour list of cell 74*i* includes the cells 72*f*, 72*i*, 74*e*, 74*g*, 74*j*, and 76*f*. Since the cell 76*f* that appears in the neighbour cell list does not appear in the list of cells in the coverage area of the network slice, it may be determined that the cell 74*i* defines at least a part of the boundary of the coverage area of the network slice.

Thus, by considering all of the cells in the tracking areas 72, 74, it can be determined that the cells that define the boundary of the network slice that is made up of the tracking areas 72, 74 would be the cells 72*a*, 72*b*, 72*c*, 72*e*, 72*h*, 72*i*, 72*j*, 74*a*, 74*b*, 74*c*, 74*f*, 74*h*, 74*i*, and 74*j*.

It will also be noted that, while cells such as the cells 72*a*, 72*c*, and 72*e* are in the boundary of the network slice that is made up of the tracking areas 72, 74, the same cells are also in the boundary of the network slice that is made up of the tracking areas 72, 76, and it will also be noted that these network slices may be of different types.

By contrast, it was noted above that the cell 72*f* does not define a part of the boundary of the coverage area of the network slice that is made up of the tracking areas 72, 74. However, the cell 72*f* does define a part of the boundary of the coverage area of the network slice that is made up of the tracking areas 72, 76.

Thus, for each defined network slice, as shown at step 62 of the method of FIG. 5, information is stored identifying a plurality of cells that define at least a part of a boundary of a coverage area of the network slice. This information may be stored in a control node serving multiple cells, and/or may be stored in a radio node serving only one cell. In that case, as mentioned above, the cell may be identified as a boundary cell for one or more network slice, and as a non-boundary cell for one or more other network slice.

The stored information may be used to identify, for each network slice, the cells that are boundary cells and the cells that are non-boundary cells. Equivalently, the stored information may be used to identify, for each cell, the network slices for which that cell is a boundary cells and the network slices for which that cell is a non-boundary cell.

Then, policies that apply to the relevant network slice are pre-configured, for example by a control node of the network, and stored for use by each cell.

As described above, a preliminary algorithm provides information to be stored and used in the method of FIG. 5. As described in more detail below, the method of FIG. 5 distinguishes between the cells that define the boundary of a network slice, and the cells that are not part of the boundary of the network slice.

Therefore, it will be appreciated that, following the instantiation of the multiple cells of the network 70, the preliminary algorithm will distinguish between the cells that define the boundary of a network slice, and the cells that are not part of the boundary of a network slice.

However, it is likely that, over time, the radio coverage provided by the network 70 will be modified. For example, changing demands for network capacity may require that the radio coverage provided by the network 70 is modified. In one example, the demand for network capacity may increase, and an existing cell of the network 70 may experience an increase in traffic load as a result of this. An increase in the traffic load of a cell may contribute to a reduction in the effective coverage area of that cell. In some examples, an increase in the traffic load of a cell may result in areas with no coverage (also known as "white spots") appearing within the network. To address a reduction in the effective coverage area of a cell of the network 70, the operator of the network 70 may deploy additional cells within the network 70, for example by deploying additional radio nodes. Thus, one or more additional cells may be deployed to produce an increase in the network capacity.

In another example, the demand for network capacity may decrease, and an existing cell of the network 70 may be removed from the network 70. For example, an operator of the network 70 may decide to "lock" a cell that is determined to have a low traffic level, for example at certain times of the day or week. The removal of a cell in this way may have the advantage that it reduces energy consumption in the network 70.

Thus, it will be appreciated that, in response to the changing traffic requirements of a network 70, cells may be added to, or removed from, the network 70.

Following the addition of cells to, (or the removal of cells from, the network 70, the stored information that may be used to identify, for each network slice, the cells that are boundary cells and the cells that are non-boundary cells, may no longer be accurate. It will be appreciated that, following the addition of cells to, or the removal of cells from, the network 70, the boundary cells of one of more network slices of the network 70 may change. Thus, the stored information that is based on the network slices that are defined at the time the cells of the network 70 are instantiated, may no longer accurately identify the boundary cells (and the cells that are non-boundary cells) of the network slices within the network 70.

The stored information (as described above) may comprise a record of border cells of network slices. For example, as described with reference to FIG. 7, the stored information may, for the network slice that is made up of the tracking areas 72, 74, comprise a record of the border cells 72a, 72b, 72c, 72e, 72h, 72i, 72j, 74a, 74b, 74c, 74e, 74f, 74h, 74i, and 74j.

Presently, the method (as described with reference to FIG. 5 above) is not able to evaluate changes in the cell coverage of the network 70, and, following this evaluation, to update the stored information, such that the stored information accurately reflects the state of the updated network 70. In other words, the method (as described above) is presently unaware of changes in the cell coverage of the network 70.

Thus, it would be beneficial if a method that is capable of updating a record of border cells of network slices based on a change in the cells active in a network, could be provided.

Figure 8:
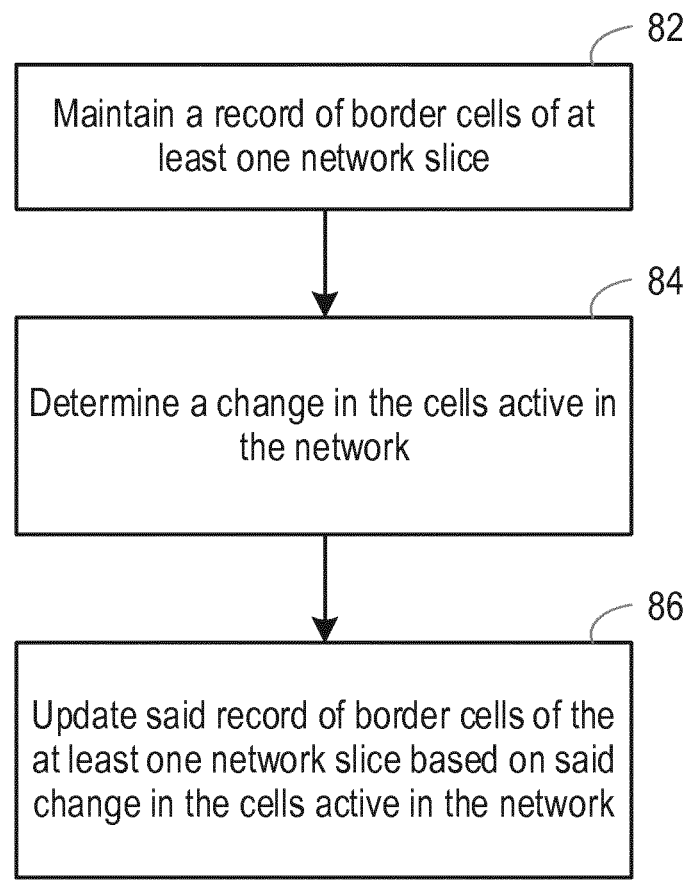
FIG. 8 is a flow chart, illustrating a method of monitoring cells in a cellular communication network.

FIG. 8 is a flow chart, illustrating a method of monitoring cells in a cellular communication network.

At step 82 of the method shown in FIG. 8, a record of border cells of network slices is maintained. The record may for example be obtained by performing the method described in FIG. 5, or from a performance of the method shown in FIG. 8.

At step 84 of the method shown in FIG. 8, a change is determined in the cells active in the network.

For example, a notification that a cell has been added to or removed from the cellular communication network may be received. There may be maintained a list of active cells in the cellular communication network and the cell is then added to or removed from said list of active cells. The notification may be received following an unplanned event occurring in the network, e.g. a failure of a base station or its part, or a planned event, e.g. maintenance work in which a base station (or a single cell) has been turned off or a new base station (or cell) has been added to the network to improve network coverage.

At step 86 of the method shown in FIG. 8, said record of border cells of network slices is updated based on said change in the cells active in the network.

It will be appreciated that the method of FIG. 8 may be performed in any suitable network node (for example, the network node 50, or the radio management node 24, or the radio management node 42, as described above).

For example, the processor 54 of network node 50 may be configured for maintaining a record of border cells of at least one network slice, determining a change in the cells active in the network, and updating said record of border cells of at least one network slice based on said change in the cells active in the network.

Preferably, in order to determine whether the added cell is a border cell of a network slice the method may comprise comparing neighbours of said added cell against a list of cells in the coverage area of said at least one network slice. Then, if one or more cell appearing among the neighbours does not appear in the list of cells in the coverage area of said at least one network slice it is determined that said added cell defines at least a part of a boundary of the coverage area of said at least one network slice (i.e. the added cell is a border cell of the network slice).

Corresponding operations to the ones described above may be performed with respect of a cell removed from the network. If not all neighbours of said removed cell belong to the identified slice the removed cell was a border cell.

This information may be then used to update said record of border cells of the at least one network slice.

The method in its various embodiments may be implemented in a network node comprising a processor and a memory wherein the memory contains instructions executable by the processor such that the network node is operative to perform the operations of the method.

Figure 9:
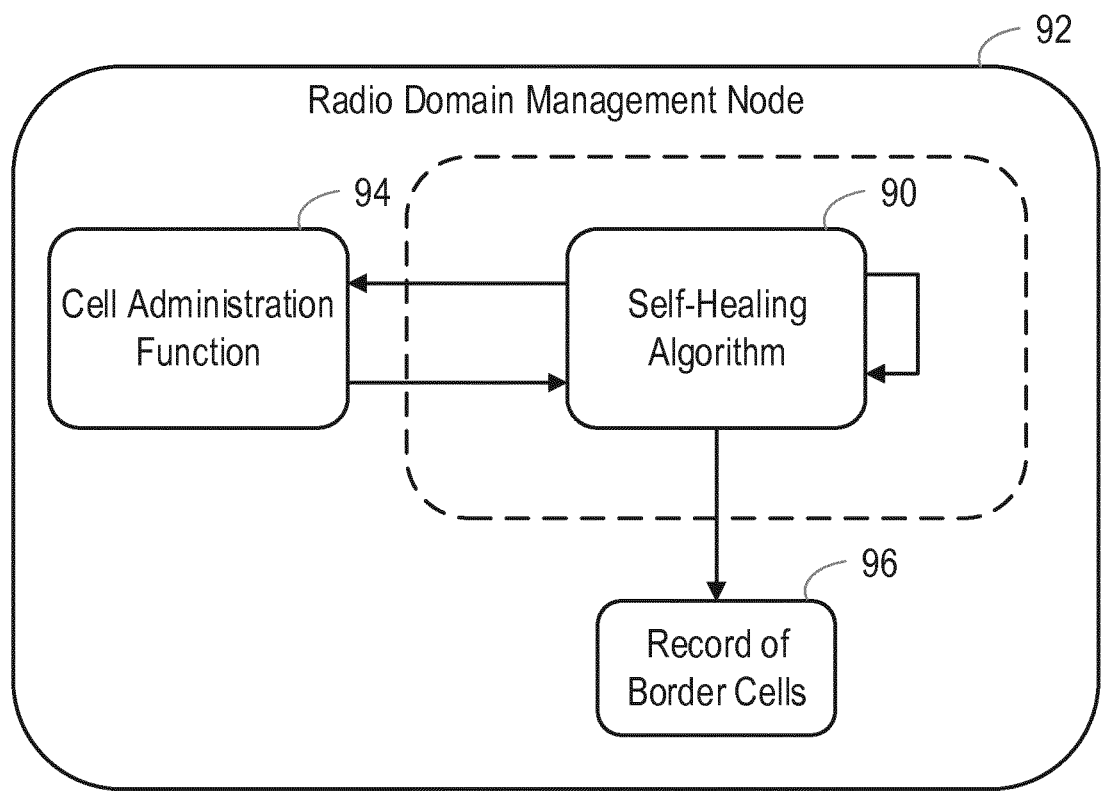
FIG. 9 illustrates one possible embodiment implementing the method of FIG. 8.

FIG. 9 illustrates one possible embodiment implementing the method of FIG. 8.

A self-healing algorithm 90 maintains a record of border cells of network slices within a network (for example, the network 70 described above). In other words, a record of the border cells of the network slices that have been deployed within a network (and that have a defined radio configuration and a defined coverage area) is maintained by the self-healing algorithm 90.

In this embodiment, the self-healing algorithm 90 has been deployed in the radio domain management node 92, and thus, the record of the border cells of the network slices has been created in the radio domain management node 92, and is maintained by the radio domain management node 92. One advantage of deploying the self-healing algorithm 90 in the radio domain management node 92 is that a multi domain view of a slice coverage area and its associated border cells is provided.

However, it will be appreciated that the deployment of the self-healing algorithm 90 may be dependent on the radio deployment. For example, in an LTE PNF deployment, the self-healing algorithm 90 may be deployed in every eNodeB. In another example, in an NR deployment, the self-healing algorithm 90 may be deployed in every Radio Control Node hosting the RCF function. These nodes may be physical or virtual. The self-healing algorithm 90 may also be deployed in the network manager, which also provided a multi domain view of a slice coverage area and its associated border cells.

However, regardless of the configuration of the deployment of the self-healing algorithm 90, this configuration will be controlled from, and persisted in, the radio domain management node 92.

Thus, as shown at step 82 of the method of FIG. 8, a record of border cells of network slices is maintained.

The record of border cells of network slices may comprise a list of the border cells of each network slice comprised within the network.

In this illustrated embodiment, the self-healing algorithm 90 is subscribed to the cell administration function 94. Therefore, the cell administration function 94 will notify the self-healing algorithm 90 following a change in the active cells in the network 70. For example, this change may be an addition of a cell to the network. Alternatively, this change may be a removal of a cell from the network.

Thus, as shown at step 84 of the method of FIG. 8, a change is determined in the cells active in the network.

Upon receiving this notification from the cell administration function 94, the self-healing algorithm 90 may then determine a list of potentially impacted network slices, based on the determined change in the active cells in the network 70.

Following this determination of a list of potentially impacted network slices, the self-healing algorithm 90 may cause the execution the predetermined algorithm described above (for each of the potentially impacted network slices). As a result of this execution of the predetermined algorithm, the self-healing algorithm 90 may then determine a change in the record of the border cells of the network slices in the network 70.

Finally, the self-healing algorithm 90 may update the record 96 of border cells of network slices, based on said change in the cells active in the network. For example, the record may be updated using the determined change in the record of the border cells of the network slices in the network 70.

Thus, as shown at step 86 of the method of FIG. 8, said record of border cells of network slices is updated based on said change in the cells active in the network.

Figure 10:
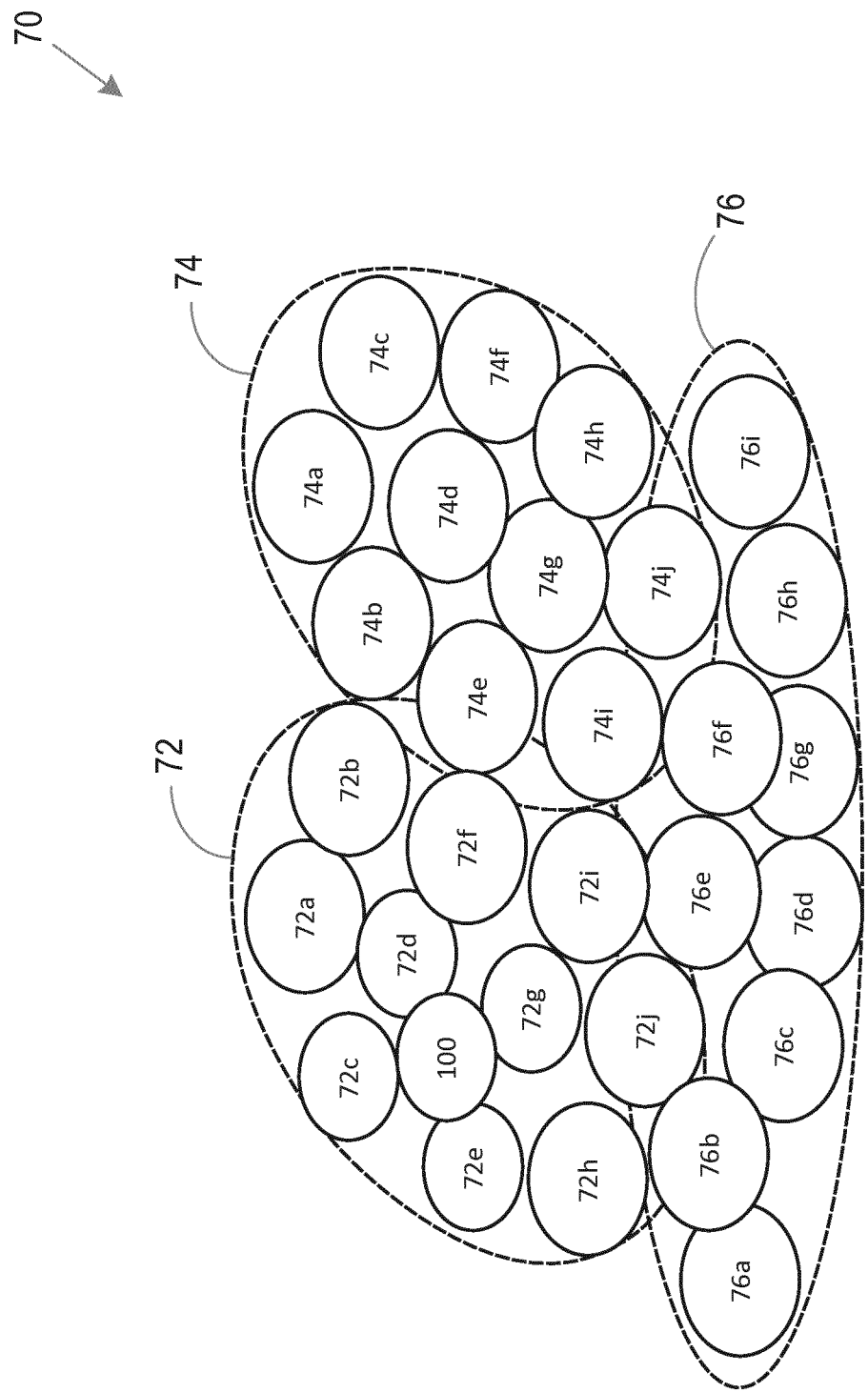
FIG. 10 illustrates the addition of a new cell, which is not a border cell, to a network.

FIG. 10 illustrates the addition of a new cell 100, which is not a border cell, to the network 70. The new cell 110 is added to the tracking area 72.

As described above, the self-healing algorithm 90 maintains a record of border cells of the network slices within the network 70.

Thus, as shown at step 82 of the method of FIG. 8, a record of border cells of network slices is maintained.

Following the addition of the cell 100 to the network 70, the cell administration function 94 will notify the self-healing algorithm 90 that a cell has been added to the network 70.

Thus, as shown at step 84 of the method of FIG. 8, a change is determined in the cells active in the network.

Following this determination by the self-healing algorithm 90 that a cell has been added to the network 70, the self-healing algorithm 90 will identify the neighbours of the newly added cell 100. For example, as part of its normal operation, the cell 100 may make measurements of nearby cells, and the neighbours of the cell 100 may be identified based on these measurements. Alternatively, or additionally, if a neighbour cell list for the cell 100 already exists at the time that the method of FIG. 8 is performed, this pre-existing list of neighbour cells may be used.

In this embodiment, the neighbours of cell 100 will be identified as the cells 72*c*, 72*d*, 72*e*, and 72*g*.

Following this, the self-healing algorithm 90 will then identify which of the identified neighbours of the cell 100 are border cells of at least one network slice.

For example, the record of border cells of the network slices may be used to identify which of the identified neighbours of the cell 100 are border cells of at least one network slice.

Specifically, the previously obtained record of the cells that are border cells of at least one network slice is compared with the list of neighbours of the newly added cell 100. Cells that appear on both lists are the neighbours of the cell 100 that are also border cells of at least one network slice.

Thus, in this example, the cell 72*c* will be identified as a border cell of the network slice that is made up by the tracking areas 72, 74, and of the network slice that is made up by the tracking areas 72, 76. Similarly, the cell 72*e* will be identified as a border cell of the network slice that is made up by the tracking areas 72, 74, and of the network slice that is made up by the tracking areas 72, 74; and 72, 76.

Following this, the self-healing algorithm 90 will identify said at least one network slice.

Thus, the network slice that is made up of the tracking areas 72, 74, and the network slice that is made up of the tracking areas 72, 76, will be identified by the self-healing algorithm 90.

Following the identification of the at least one network slice, the self-healing algorithm 90 will identify the border cells of said at least one network slice.

In order to identify the border cells of said at least one network slice, the neighbour lists of the cells in said at least one network slice may be used. Specifically, in this embodiment, for a plurality of individual cells in the coverage area of said at least one network slice, the neighbour cell list of that individual cell is compared against the full list of cells in the coverage area of said at least one network slice. If one or more cell appearing in the neighbour cell list does not appear in the list of cells in the coverage area of said at least one network slice, it may be determined that that cell defines at least a part of the boundary of the coverage area of said at least one network slice. In some embodiments, the steps of (a) comparing the neighbour cell list of the individual cell against the full list of cells in the coverage area of said at least one network slice and (b) determining that that individual cell defines at least a part of the boundary of the coverage area of said at least one network slice if one or more cell appearing in the neighbour cell list does not appear in the list of cells in the coverage area of said at least one network slice, are performed for each individual cell in the coverage area of said at least one network slice. Based on said determining for each individual cell in the coverage area of said at least one network slice, the border cells of said at least one network slice may thus be identified.

Thus, the cells that define the boundary of a network slice, and the cells that are not part of the boundary of a network slice, are distinguished.

In this embodiment, the cells that define the boundary of the network slice that is made up of the tracking areas 72, 74 will be identified as the cells 72*a*, 72*b*, 72*c*, 72*e*, 72*h*, 72*i*, 72*j*, 74*a*, 74*b*, 74*c*, 74*f*, 74*h*, 74*i*, and 74*j*.

The cells that define the boundary of the network slice that is made up of the tracking areas 72, 76 will be identified as the cells 72*a*, 72*c*, 72*e*, 72*h*, 76*a*, 76*c*, 76*d*, 76*g*, 76*h*, 76*i*, 76*f*, 72*i*, 72*f*, and 72*b*.

Finally, the self-healing algorithm 90 updates the record of border cells of network slices based on said change in the cells active in the network. In this illustrated embodiment, the cells that define the boundary of the network slice that is made up of the tracking areas 72, 74 would be the cells 72*a*, 72*b*, 72*c*, 72*e*, 72*h*, 72*i*, 72*j*, 74*a*, 74*b*, 74*c*, 74*f*, 74*h*, 74*i*, and 74*j*, which is unchanged despite the addition of the cell 100 to the network 70. Likewise, the cells that define the boundary of the network slice that is made up of the tracking areas 72, 76, are unchanged.

Thus, the self-healing algorithm 90 will maintain this record of the border cells of the network slices that are made up of the tracking areas 72, 74; and 72, 76, following the addition of the cell 100 to the network 70.

Thus, as shown at step 86 of the method of FIG. 8, said record of border cells of network slices is updated based on said change in the cells active in the network It will be appreciated that, in this illustrated embodiment, there has been no change to record of the border cells, despite the addition of a cell (which is not a border cell) to the network.

Figure 11:
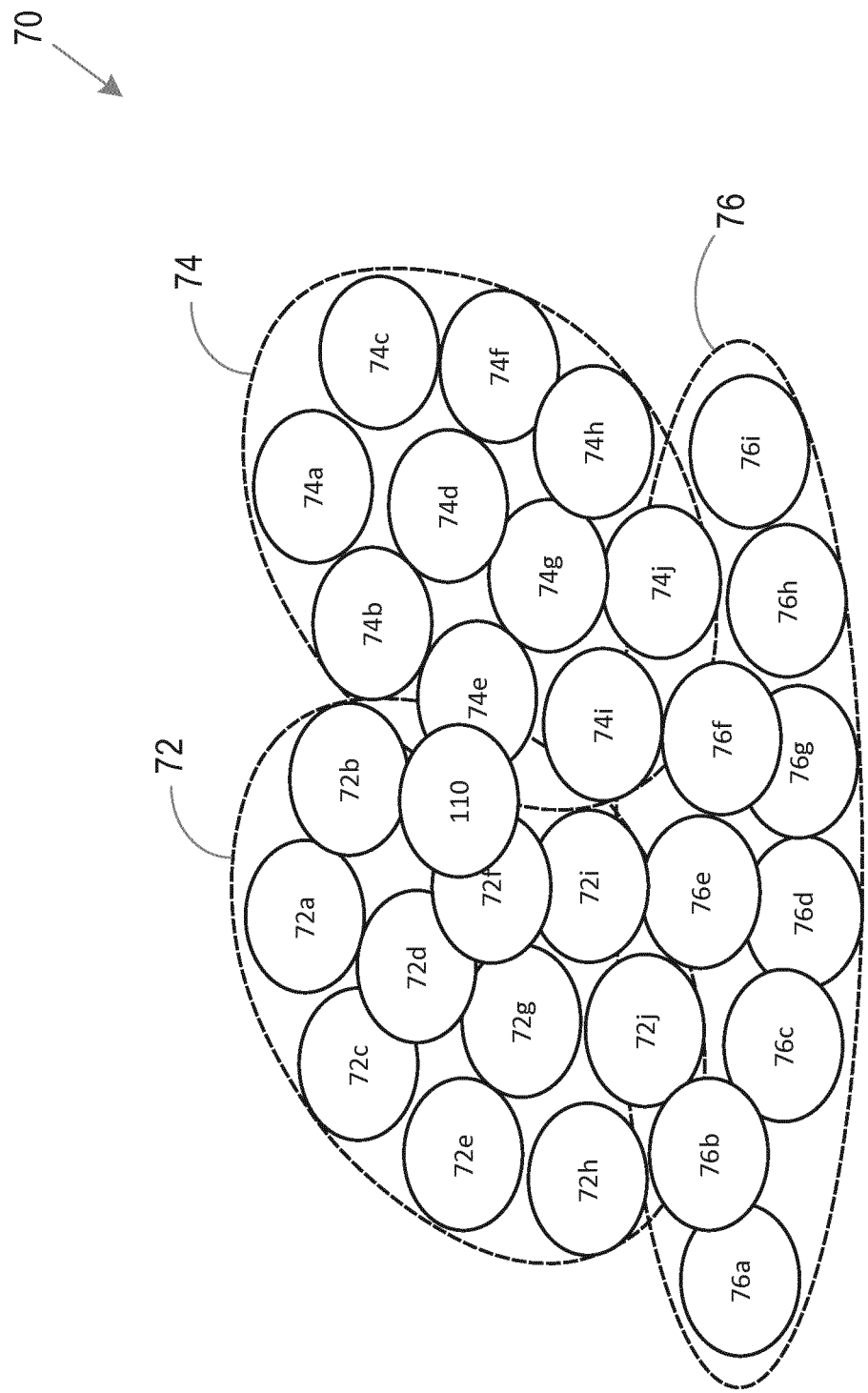
FIG. 11 illustrates the addition of a new cell, which is a border cell, to a network.

FIG. 11 illustrates the addition of a new cell 110, which is a border cell, to the network 70.

The new cell 110 is added to the tracking area 72.

As described above, the self-healing algorithm 90 maintains a record of border cells of the network slices within the network 70.

Thus, as shown at step 82 of the method of FIG. 8, a record of border cells of network slices is maintained.

Following the addition of the cell 110 to the network 70, the cell administration function 94 will notify the self-healing algorithm 90 that a cell has been added to the network 70.

Thus, as shown at step 84 of the method of FIG. 8, a change is determined in the cells active in the network.

Following this determination by the self-healing algorithm 90 that a cell has been added to the network 70, the self-healing algorithm 90 will identify the neighbours of the newly added cell 110. For example, as part of its normal operation, the cell 110 may make measurements of nearby cells, and the neighbours of the cell 110 may be identified based on these measurements. Alternatively or additionally, if a neighbour cell list for the cell 110 already exists at the time that the method of FIG. 8 is performed, this pre-existing list of neighbour cells may be used.

In this embodiment, the neighbours of cell 110 will be identified as the cells 72b, 72f, 74b, and 74e.

Following this, the self-healing algorithm 90 will then identify which of the identified neighbours of the cell 110 are border cells of at least one network slice.

For example, the record of border cells of the network slices may be used to identify which of the identified neighbours of the cell 110 are border cells of at least one network slice.

Specifically, the previously obtained record of the cells that are border cells of at least one network slice is compared with the list of neighbours of the newly added cell 110. Cells that appear on both lists are the neighbours of the cell 110 that are also border cells of at least one network slice.

Thus, in this example, the cell 72b will be identified as a border cell of the network slice that is made up by the tracking areas 72, 74, and will be identified as a border cell of the network slice that is made up by the tracking areas 72, 76. The cell 74b will be identified as a border cell of the network slice that is made up by the tracking areas 72, 74, and will be identified as a border cell of the network slice that is made up by the tracking areas 74, 76. The cell 72f will be identified as a border cell of the network slice that is made up by the tracking areas 72, 76. The cell 74e will be identified as a border cell of the network slice that is made up by the tracking areas 74, 76.

Following this, the self-healing algorithm 90 will identify said at least one network slice.

Thus, in this example the network slice that is made up of the tracking areas 72, 74, the network slice that is made up of the tracking areas 72, 76, and the network slice that is made up of the tracking areas 74, 76 will all be identified by the self-healing algorithm 90.

Following the identification of the at least one network slice, the self-healing algorithm 90 will identify the border cells of said at least one network slice.

In order to identify the border cells of said at least one network slice, the neighbour lists of the cells in said at least one network slice may be used. Specifically, in this embodiment, for a plurality of individual cells in the coverage area of said at least one network slice, the neighbour cell list of that individual cell is compared against the full list of cells in the coverage area of said at least one network slice. If one or more cell appearing in the neighbour cell list does not appear in the list of cells in the coverage area of said at least one network slice, it may be determined that that cell defines at least a part of the boundary of the coverage area of said at least one network slice. In some embodiments, the steps of (a) comparing the neighbour cell list of the individual cell against the full list of cells in the coverage area of said at least one network slice and (b) determining that that individual cell defines at least a part of the boundary of the coverage area of said at least one network slice if one or more cell appearing in the neighbour cell list does not appear in the list of cells in the coverage area of said at least one network slice, are performed for each individual cell in the coverage area of said at least one network slice. Based on said determining for each individual cell in the coverage area of said at least one network slice, the border cells of said at least one network slice may thus be identified.

Thus, the cells that define the boundary of a network slice, and the cells that are not part of the boundary of a network slice, are distinguished.

In this embodiment, the cells that define the boundary of the network slice that is made up of the tracking areas 72, 74 will be identified as the cells 72a, 72b, 72c, 72e, 72h, 72i, 72j, 74a, 74b, 74c, 74f, 74h, 74i, and 74j.

The cells that define the boundary of the network slice that is made up of the tracking areas 72, 76 will be identified as the cells 72a, 72c, 72e, 72h, 76a, 76c, 76d, 76g, 76h, 76i, 76f, 72i, 72b, and 110. The cell 110 is identified as a border cell of the network slice because it has neighbours, namely the cells 74b and 74e, that are not in that network slice.

The cells that define the boundary of the network slice that is made up of the tracking areas 74, 76 will be identified as the cells 74a, 74b, 74e, 74i, 76e, 76b, 76a, 76c, 76d, 76g, 76h, 76i, 74h, 74f, and 74c.

Finally, the self-healing algorithm 90 updates the record 96 of border cells of network slices based on said change in the cells active in the network. In this illustrated embodiment, the cells that define the boundary of the network slice that is made up of the tracking areas 72, 74 would be the cells 72a, 72b, 72c, 72e, 72h, 72i, 72j, 74a, 74b, 74c, 74f, 74h, 74i, and 74j, which is unchanged despite the addition of the cell 110 to the network 70. Thus, the self-healing algorithm 90 will maintain this record of the border cells of the network slice that is made up of the tracking areas 72, 74, following the addition of the cell 110 to the network 70.

The cells that define the boundary of the network slice that is made up of the tracking areas 74, 76 are also unchanged, despite the addition of the cell 110 to the network 70. Thus, the self-healing algorithm 90 will maintain this record of the border cells of the network slice that is made up of the tracking areas 74, 76, following the addition of the cell 110 to the network 70.

However, the cells that define the boundary of the network slice that is made up of the tracking areas 72, 76 are the cells 72a, 72c, 72e, 72h, 76a, 76c, 76d, 76g, 76h, 76i, 76f, 72i, 72b, and 110. Previously, the cells that defined the boundary of the network slice that is made up of the tracking areas 72, 76 were the cells 72a, 72c, 72e, 72h, 76a, 76c, 76d, 76g, 76h, 76i, 76f, 72i, 72b, and 72f. Thus, the self-healing algorithm 90 will update the record 96 of border cells of the network slice that is made up of the tracking areas 72, 76, based on the addition of the cell 110 to the network 70.

Thus, as shown at step 86 of the method of FIG. 8, said record of border cells of network slices is updated based on said change in the cells active in the network It will be appreciated that, in this illustrated embodiment, there has been a change to record of the border cells, following the addition of a cell (which is a border cell) to the network. Specifically, the record of border cells of the network slice that is made up of the tracking areas 72, 76 has changed, whereas the record of border cells of the network slices that are made up of the tracking areas 72, 74; and 74, 76 respectively, have been maintained.

Figure 12:
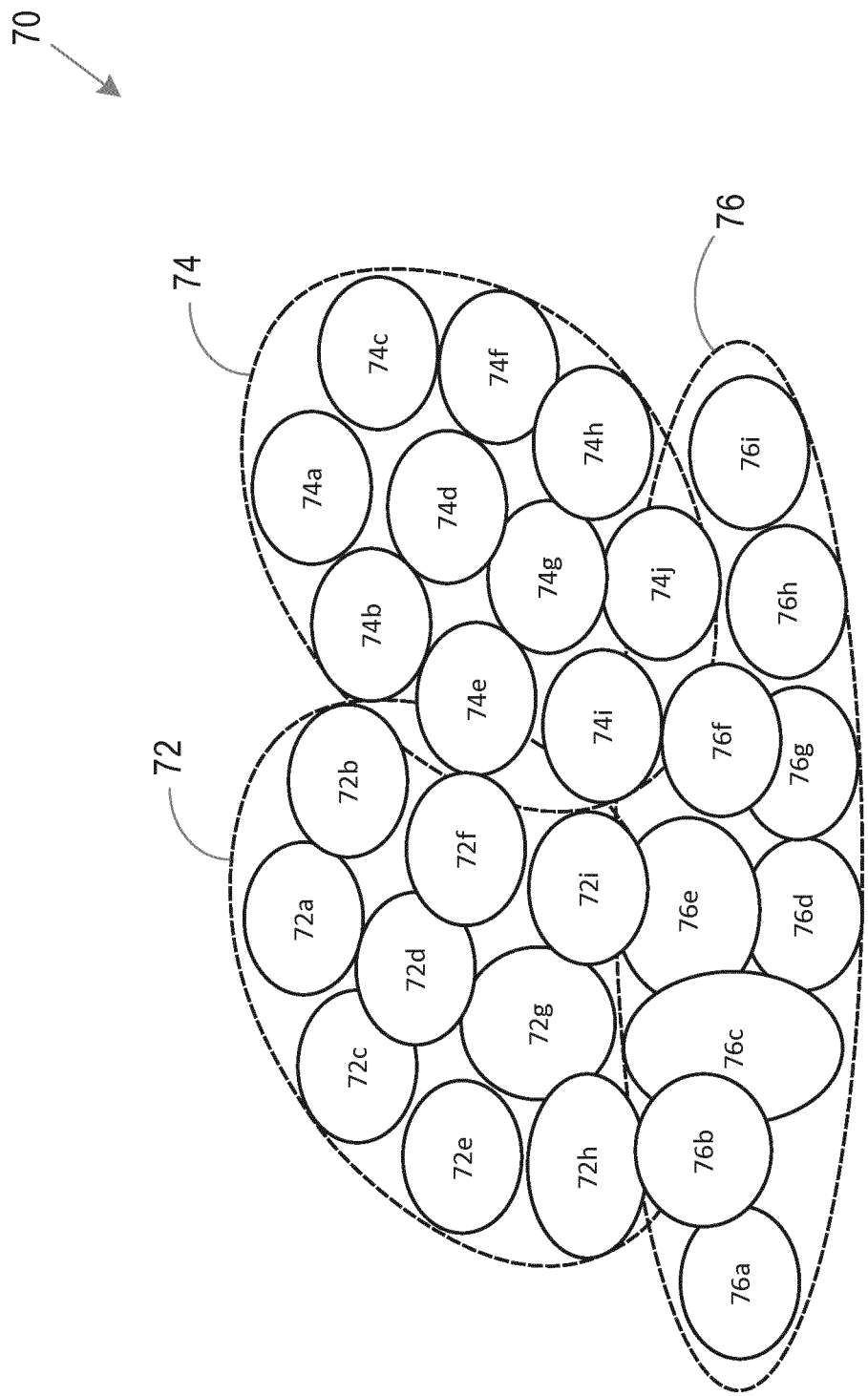
FIG. 12 illustrates the removal of a cell, which is a border cell, from a network.

FIG. 12 illustrates the removal of cell 72j, which is a border cell, from the network 70.

As described above, the self-healing algorithm 90 maintains a record of border cells of the network slices within the network 70.

Thus, as shown at step 82 of the method of FIG. 8, a record of border cells of network slices is maintained.

Following the decision to remove the cell 72j, the cell administration function 94 will notify the self-healing algorithm 90 that a cell will be, or has been, removed from the network 70.

Thus, as shown at step 84 of the method of FIG. 8, a change is determined in the cells active in the network.

Following this determination by the self-healing algorithm 90 that a cell will be, or has been, removed from the network 70, the self-healing algorithm 90 will identify the cells that are, or were, neighbours of the removed cell 72*j*. For example, measurements that have previously been made by the cell 72*j* of nearby cells may be used (which may have been made as part of the cell's normal operation), and the neighbours of the cell 72*j* may be identified based on these measurements. For example, if a neighbour cell list for the cell 72*j* exists at the time that the method of FIG. 8 is performed, this pre-existing list of neighbour cells may be used.

In this embodiment, the neighbours of cell 72*j* will be identified as the cells 72*g*, 72*h*, 72*i*, 76*b*, 76*c*, and 76*e*.

Following this, the self-healing algorithm 90 will then identify which of the identified neighbours of the cell 72*j* are border cells of at least one network slice.

For example, the record of border cells of the network slices may be used to identify which of the identified neighbours of the cell 72*j* are border cells of at least one network slice.

Specifically, the previously obtained record of the cells that are border cells of at least one network slice is compared with the list of neighbours of the removed cell 72*j*. Cells that appear on both lists are the neighbours of the cell 72*j* that are also border cells of at least one network slice.

Thus, in this example, the cell 72*h* will be identified as a border cell of the network slice that is made up by the tracking areas 72, 74, and will be identified as a border cell of the network slice that is made up by the tracking areas 72, 76. The cell 72*i* will be identified as a border cell of the network slice that is made up by the tracking areas 72, 74, and will be identified as a border cell of the network slice that is made up by the tracking areas 72, 76. The cell 76*b* will be identified as a border cell of the network slice that is made up by the tracking areas 74, 76. The cell 76*c* will be identified as a border cell of the network slice that is made up by the tracking areas 74, 76, and will be identified as a border cell of the network slice that is made up by the tracking areas 72, 76. The cell 76*e* will be identified as a border cell of the network slice that is made up by the tracking areas 74, 76, and will be identified as a border cell of the network slice that is made up by the tracking areas 72, 76.

Following this, the self-healing algorithm 90 will identify said at least one network slice.

Thus, the network slice that is made up of the tracking areas 72, 74, the network slice that is made up of the tracking areas 72, 76, and the network slice that is made up of the tracking areas 74, 76 will be identified by the self-healing algorithm 90.

Following the identification of the at least one network slice, the self-healing algorithm 90 will identify the border cells of said at least one network slice.

In order to identify the border cells of said at least one network slice, the neighbour lists of the cells in said at least one network slice may be used. Specifically, in this embodiment, for a plurality of individual cells in the coverage area of said at least one network slice, the neighbour cell list of that individual cell is compared against the full list of cells in the coverage area of said at least one network slice. If one or more cell appearing in the neighbour cell list does not appear in the list of cells in the coverage area of said at least one network slice, it may be determined that that cell defines at least a part of the boundary of the coverage area of said at least one network slice. In some embodiments, the steps of (a) comparing the neighbour cell list of the individual cell against the full list of cells in the coverage area of said at least one network slice and (b) determining that that individual cell defines at least a part of the boundary of the coverage area of said at least one network slice if one or more cell appearing in the neighbour cell list does not appear in the list of cells in the coverage area of said at least one network slice, are performed for each individual cell in the coverage area of said at least one network slice.

Based on said determining for each individual cell in the coverage area of said at least one network slice, the border cells of said at least one network slice may thus be identified.

Thus, the cells that define the boundary of a network slice, and the cells that are not part of the boundary of a network slice, are distinguished.

In this embodiment, the cells that define the boundary of the network slice that is made up of the tracking areas 72, 74 will be identified as the cells 72*a*, 72*b*, 72*c*, 72*e*, 72*g*, 72*h*, 72*i*, 74*a*, 74*b*, 74*c*, 74*f*, 74*h*, 74*i*, and 74*j*.

The cells that define the boundary of the network slice that is made up of the tracking areas 72, 76 will be identified as the cells 72*a*, 72*c*, 72*e*, 72*h*, 76*a*, 76*c*, 76*d*, 76*g*, 76*h*, 76*i*, 76*f*, 72*i*, 72*j*, and 72*b*.

The cells that define the boundary of the network slice that is made up of the tracking areas 74, 76 will be identified as the cells 74*a*, 74*b*, 74*e*, 74*i*, 76*e*, 76*b*, 76*a*, 76*c*, 76*d*, 76*g*, 76*h*, 76*i*, 74*h*, 74*f*, and 74*c*.

Finally, the self-healing algorithm 90 updates the record 96 of border cells of network slices based on said change in the cells active in the network. In this illustrated embodiment, the cells that define the boundary of the network slice that is made up of the tracking areas 72, 76; and the cells that define the boundary of the network slice that is made up of the tracking areas 74, 76, are both unchanged, despite the removal of the cell 72*j* from the network 70. Thus, the self-healing algorithm 90 will maintain the record of the border cells of the network slice that is made up of the tracking areas 72, 76; and will maintain the record of the border cells of the network slice that is made up of the tracking areas 74, 76, following the removal of the cell 72*j* from the network 70.

However, as noted above, the cells that define the boundary of the network slice that is made up of the tracking areas 72, 74 are the cells 72*a*, 72*b*, 72*c*, 72*e*, 72*g*, 72*h*, 72*i*, 74*a*, 74*b*, 74*c*, 74*e*, 74*f*, 74*h*, 74*i*, and 74*j*. Previously, the cells that defined the boundary of the network slice that is made up of the tracking areas 72, 76 were the cells 72*a*, 72*b*, 72*c*, 72*e*, 72*h*, 72*i*, 72*j*, 74*a*, 74*b*, 74*c*, 74*e*, 74*f*, 74*h*, 74*i*, and 74*j*. Thus, the removed cell 72*j* is no longer a border cell of the network slice, while the cell 72*g* that was previously not a border cell has become a border cell. In response, the self-healing algorithm 90 will update the record of the border cells of the network slice that is made up of the tracking areas 72, 74, following the removal of the cell 72*j* from the network 70.

Thus, as shown at step 86 of the method of FIG. 8, said record 96 of border cells of network slices is updated based on said change in the cells active in the network It will be appreciated that, in this illustrated embodiment, there has been a change to record of the border cells, following the removal of a cell (which is a border cell) from the network. Specifically, the record of border cells of the network slice that is made up of the tracking areas 72, 74 has changed, whereas the record of border cells of the network slices that are made up of the tracking areas 72, 76; and 74, 76 respectively, have been maintained.

Figure 13:
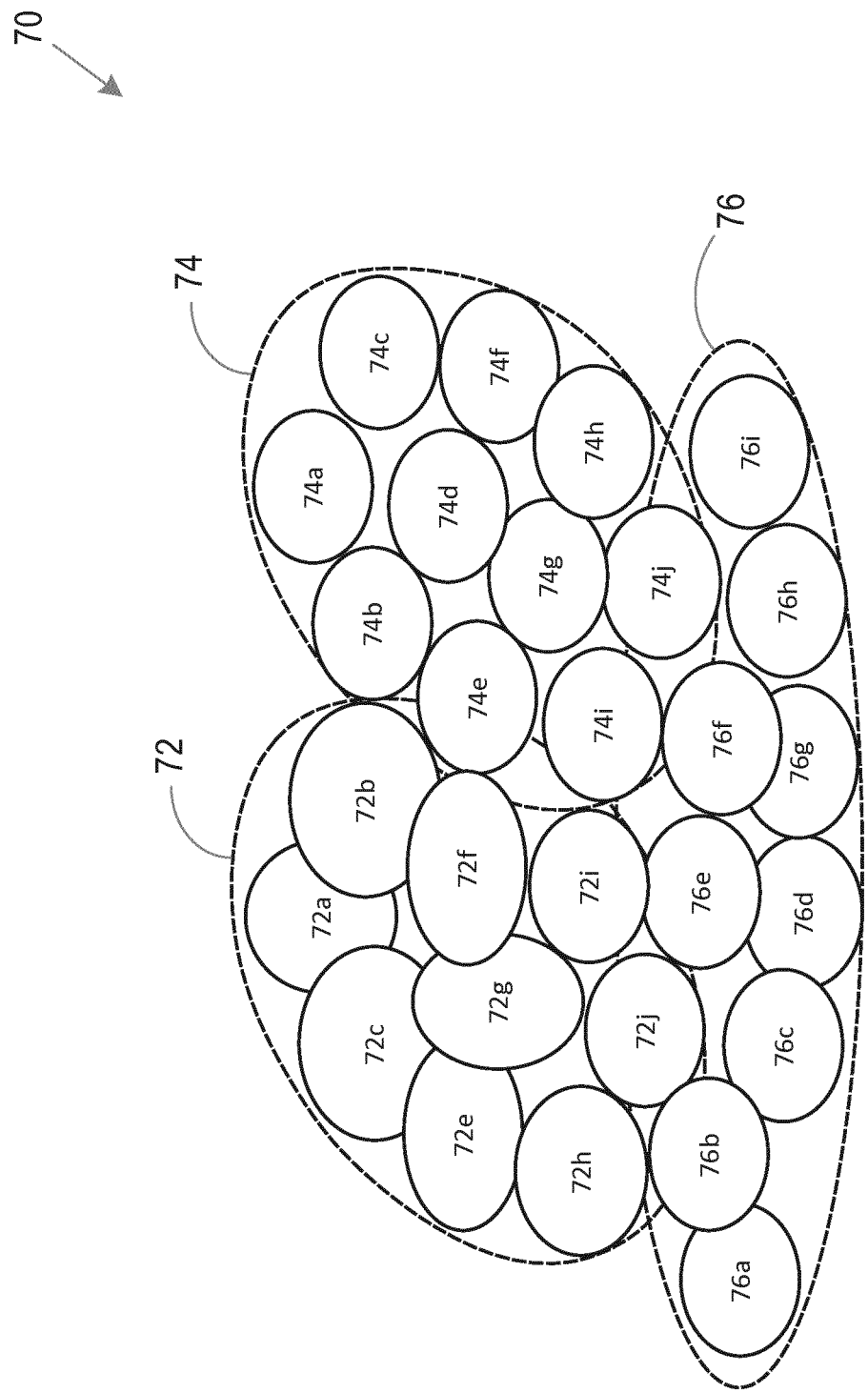
FIG. 13 illustrates the removal of a cell, which is not a border cell, from a network.

FIG. 13 illustrates the removal of cell 72*d*, which is not a border cell, from the network 70.

As described above, the self-healing algorithm 90 maintains a record of border cells of the network slices within the network 70.

Thus, as shown at step 82 of the method of FIG. 8, a record of border cells of network slices is maintained.

Following the decision to remove cell 72*d*, the cell administration function 94 will notify the self-healing algorithm 90 that a cell will be, or has been, removed from the network 70.

Thus, as shown at step 84 of the method of FIG. 8, a change is determined in the cells active in the network.

Following this determination by the self-healing algorithm 90 that a cell will be, or has been, removed from the network 70, the self-healing algorithm 90 will identify the neighbours of the removed cell 72*d*. For example, measurements that have previously been made by the cell 72*d* of nearby cells may be used (which may have been made as part of the cells normal operation), and the neighbours of the cell 72*d* may be identified based on these measurements. For example, if a neighbour cell list for the cell 72*d* exists at the time that the method of FIG. 8 is performed, this pre-existing list of neighbour cells may be used.

In this embodiment, the neighbours of cell 72*d* will be identified as the cells 72*a*, 72*b*, 72*c*, 72*e*, 72*f*, and 72*g*.

Following this, the self-healing algorithm 90 will then identify which of the identified neighbours of the cell 72*d* are border cells of at least one network slice.

For example, the record of border cells of the network slices may be used to identify which of the identified neighbours of the cell 72*d* are border cells of at least one network slice.

Specifically, the previously obtained record of the cells that are border cells of at least one network slice is compared with the list of neighbours of the removed cell 72*d*. Cells that appear on both lists are the neighbours of the cell 72*d* that are also border cells of at least one network slice.

Thus, in this example, the cells 72*a*, 72*b*, 72*c*, and 72*e* will be identified as neighbour cells or the removed cell that are also border cells of the network slice that is made up by the tracking areas 72, 74, and will also be identified as border cells of the network slice that is made up by the tracking areas 72, 76. The cell 72*f* will be identified as a neighbour of the removed cell that is also a border cell of the network slice that is made up by the tracking areas 72, 76.

Following this, the self-healing algorithm 90 will identify said at least one network slice.

Thus, the network slice that is made up of the tracking areas 72, 74, and the network slice that is made up of the tracking areas 72, 76, will be identified by the self-healing algorithm 90.

Following the identification of the at least one network slice, the self-healing algorithm 90 will identify the border cells of said at least one network slice.

In order to identify the border cells of said at least one network slice, the neighbour lists of the cells in said at least one network slice may be used. Specifically, in this embodiment, for a plurality of individual cells in the coverage area of said at least one network slice, the neighbour cell list of that individual cell is compared against the full list of cells in the coverage area of said at least one network slice. If one or more cell appearing in the neighbour cell list does not appear in the list of cells in the coverage area of said at least one network slice, it may be determined that that cell defines at least a part of the boundary of the coverage area of said at least one network slice. In some embodiments, the steps of (a) comparing the neighbour cell list of the individual cell against the full list of cells in the coverage area of said at least one network slice and (b) determining that that individual cell defines at least a part of the boundary of the coverage area of said at least one network slice if one or more cell appearing in the neighbour cell list does not appear in the list of cells in the coverage area of said at least one network slice, are performed for each individual cell in the coverage area of said at least one network slice. Based on said determining for each individual cell in the coverage area of said at least one network slice, the border cells of said at least one network slice may thus be identified.

Thus, the cells that define the boundary of a network slice, and the cells that are not part of the boundary of a network slice, are distinguished.

In this embodiment, the cells that define the boundary of the network slice that is made up of the tracking areas 72, 74 will be identified as the cells 72*a*, 72*b*, 72*c*, 72*e*, 72*h*, 72*i*, 72*j*, 74*a*, 74*b*, 74*c*, 74*f*, 74*h*, 74*i*, and 74*j*.

The cells that define the boundary of the network slice that is made up of the tracking areas 72, 76 will be identified as the cells 72*a*, 72*c*, 72*e*, 72*h*, 76*a*, 76*c*, 76*d*, 76*g*, 76*h*, 76*i*, 76*f*, 72*i*, 72*f*, and 72*b*.

Finally, the self-healing algorithm 90 updates the record of border cells of network slices based on said change in the cells active in the network. In this illustrated embodiment, the cells that define the boundary of the network slice that is made up of the tracking areas 72, 74; and the cells that define the boundary of the network slice that is made up of the tracking areas 72, 76, are both unchanged, despite the removal of the cell 72*d* from the network 70. Thus, the self-healing algorithm 90 will maintain the record of the border cells of the network slice that is made up of the tracking areas 72, 74; and will maintain the record of the border cells of the network slice that is made up of the tracking areas 72, 76, following the removal of the cell 72*d* from the network 70.

Thus, as shown at step 86 of the method of FIG. 8, said record 96 of border cells of network slices is updated based on said change in the cells active in the network It will be appreciated that, in this illustrated embodiment, there has been no change to record of the border cells, despite the removal of a cell (which is not a border cell) from the network.

Thus, in the illustrated embodiments of FIG. 10 to FIG. 13, the record of the border cells self-maintains, despite changes in network coverage. In other words, an outcome of the method of FIG. 8 is a real-time record of the border cells, that reflects all changes to the radio coverage of a network, regardless for the reasons for these changes (for example, changing network capacity, energy efficiency requirements), for the lifetime of the network slices (or other restricted coverage areas) in the network.

Thus, a method that is capable of updating a record of border cells of network slices based on a change in the cells active in a network is provided.

Figure 14:
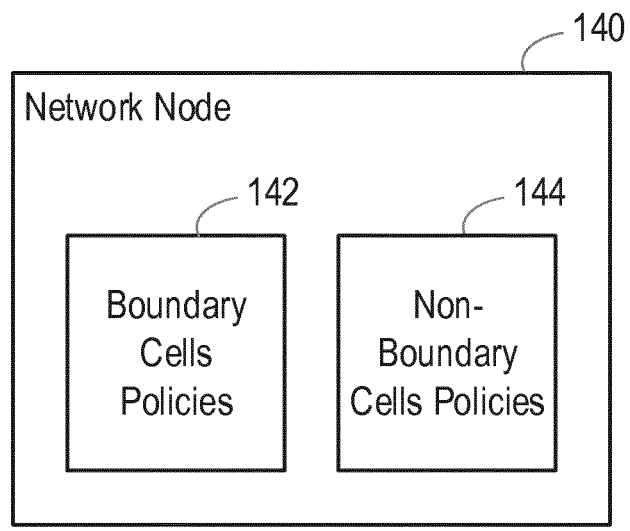
FIG. 14 illustrates the operation of a network node.

FIG. 14 illustrates a network node 140, which stores, for at least one cell, policies 142 that apply to network slices for which that cell is a boundary cell, and policies 144 that apply to network slices for which that cell is not a boundary cell. The policies 142, 144 may include policies and control mechanisms that are specific to NW Slices. The policies may relate to issues such as admission control, congestion control, mobility and energy efficiency.

Then, as shown at step 64 of the method of FIG. 5, the operation of a cell is adapted depending on whether or not the cell defines at least a part of the boundary of the coverage area of the network slice.

As described above, the network node 140 may be a radio node, providing service to a specific cell. In that case, the policies 142, 144 may relate to the operation of the network node and the cell, or to the service provided to a UE device for which that is the serving cell.

In addition, or alternatively, the network node 140 may be a control node, acting to control one or more radio nodes. In that case, the policies 142, 144 may relate to the operation of the radio node, and/or to the service provided to UE devices whose serving cell is one of the cells covered by those radio nodes.

One way in which the information covering the boundary cells can be used is to never shut down a border cell for energy efficiency. Thus, the operation of a cell, and hence the operation of a network node in the form of a radio node serving that cell, may be controlled either by the radio node itself or by an appropriate control node. It may be determined whether a cell served by the radio node is a boundary cell of one or more network slice. If the cell is not a boundary cell of any network slice, the radio node may be powered down to save energy if one or more criterion is met. This is a known feature of radio nodes. However, if the cell is a boundary cell of one or more network slice, the radio node may be kept powered up, even if the one or more criterion is met. Thus, boundary cells are treated differently, in order to improve the overall network operation.

One way in which the information covering the boundary cells can be used is to adapt the service provided to UE devices. The service provided in non-boundary cells may be the same as in existing networks, while the service provided in boundary cells may be adapted to optimize throughput and to protect the Service Level Agreements of services associated with NW Slices.

One example of this concerns admission control.

In a first situation, a first UE, UE111, is not using a network slice, and is connected to a cell that is outside the coverage area of a network slice NWS1, while a second UE, UE112, is using the network slice NWS1, and is connected to a cell that is inside the coverage area of the network slice NWS1. The two UEs, UE111 and UE112 are both requesting admission to a cell C11 that is in the coverage area of the network slice NWS1, but is not a boundary cell of the network slice NWS1. In this situation, when only one of the two UEs may be admitted to the cell C11 (for example because of cell loading), existing policies are applied to determine which of the two UEs is to be admitted to the cell C11. Referring to FIG. 14, it is a policy 144, applying to network slices for which that cell is not a boundary cell, that is applied.

In a second situation, a first UE, UE121, is not using a network slice, and is connected to a cell that is outside the coverage area of the network slice NWS1, while a second UE, UE122, is using the network slice NWS1, and is connected to a cell that is inside the coverage area of the network slice NWS1. The two UEs, UE121 and UE122 are both requesting admission to a cell C12 that is in the coverage area of the network slice NWS1, and is a boundary cell of the network slice NWS1. In this situation, when only one of the two UEs may be admitted to the cell C12 (for example because of cell loading), adapted policies are applied to determine which of the two UEs is to be admitted to the cell C12. Referring to FIG. 14, it is a policy 142, applying to network slices for which that cell is a boundary cell, that is applied.

The adapted policy 142 may be such that it gives more preference to UE122, which is requesting admission to the boundary cell, than to UE112 in the first situation, which was requesting admission to the non-boundary cell.

Another example of the adaptation of service in boundary cells concerns handover.

Figure 15:
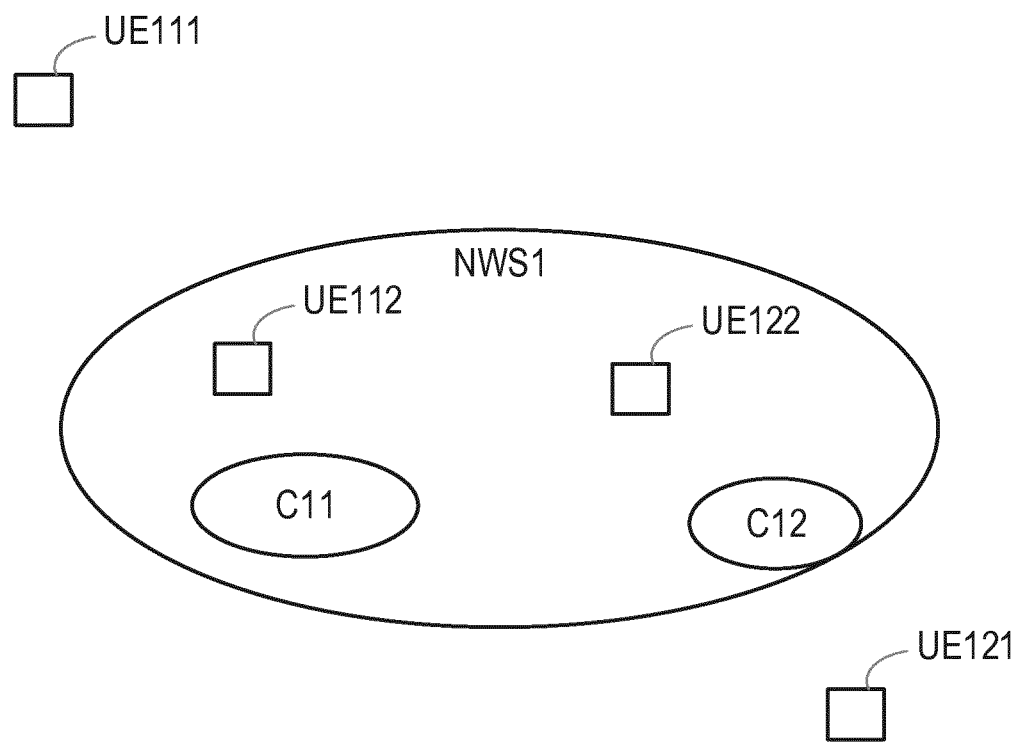
FIG. 15 illustrates a first use of the method.

In this case, in a first situation, as shown in FIG. 15, a first UE, UE211, is using a service associated with a network slice NWS2, and is connected to a cell C21 that is inside the coverage area of the network slice NWS2. A second UE, UE212, is not associated with any network slice, but is also connected to the cell C21. The cell C21 is inside the coverage area of the network slice NWS2, but is not a boundary cell of the network slice NWS2. If both UE211 and UE212 are located near the cell edge of the cell C21, and the load increases in the cell, existing policies are applied to determine which of the two UEs is to be handed over from the cell C21. Referring to FIG. 14, it is a policy 144, applying to network slices for which that cell is not a boundary cell, that is applied.

Figure 16:
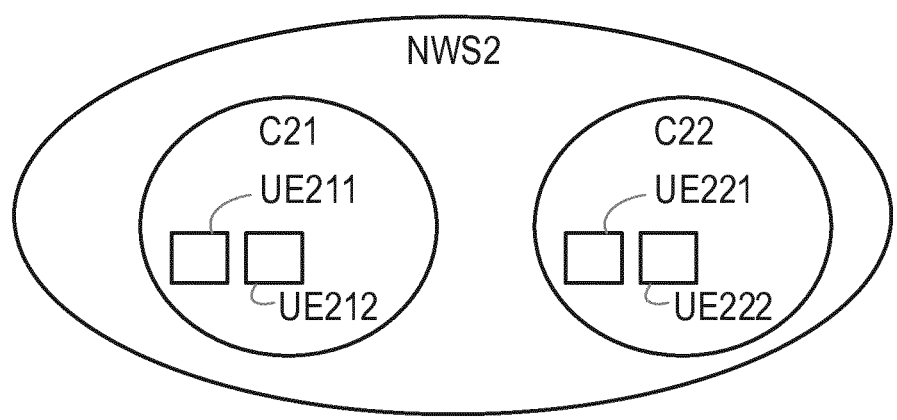
FIG. 16 illustrates a second use of the method.

In a second situation, as shown in FIG. 16, a first UE, UE221, is using a service associated with the network slice NWS2, and is connected to a cell C22 that is inside the coverage area of the network slice NWS2. A second UE, UE222, is not associated with any network slice, but is also connected to the cell C22. The cell C22 is inside the coverage area of the network slice NWS2, but it is a boundary cell of the network slice NWS2. If both UE221 and UE222 are located near the cell edge of the cell C22, and the load increases in the cell, adapted policies are applied to determine which of the two UEs is to be handed over from the cell C22. Referring to FIG. 14, it is a policy 142, applying to network slices for which that cell is a boundary cell, that is applied.

The adapted policy 142 may be such that it gives more preference to allowing the UE UE221 to remain connected to its current serving cell, because that cell is a boundary cell, than to allowing the UE UE212 in the first situation to remain connected to its serving cell, which was a non-boundary cell. This helps to avoid the situation where the Service Level Agreement of the UE UE221 is breached because the UE is handed over.

Figure 17:
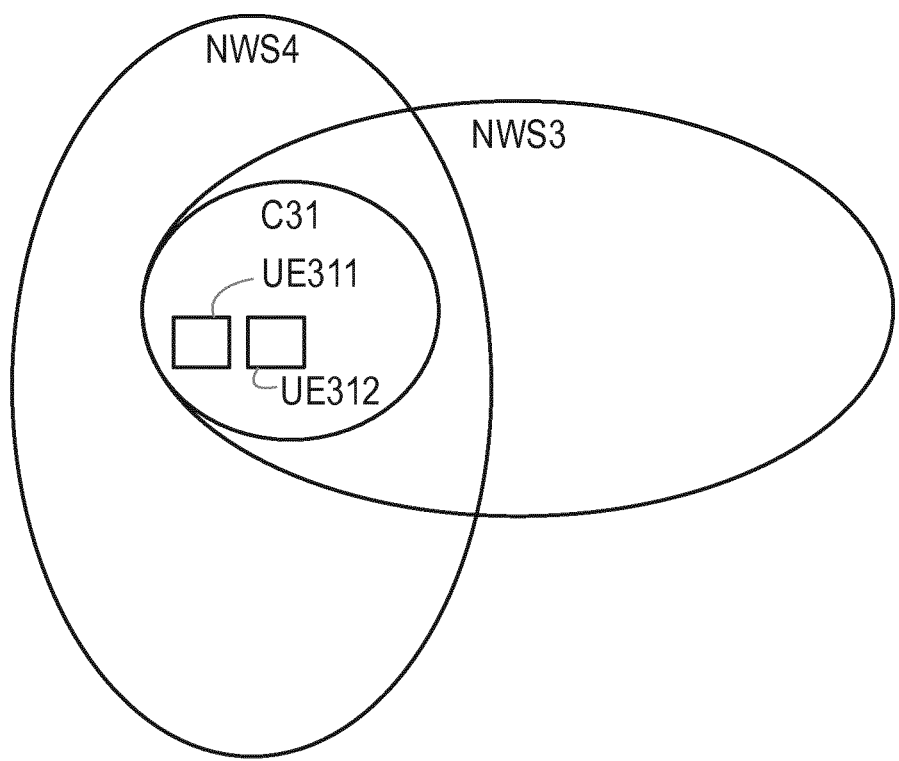
FIG. 17 illustrates a third use of the method.

A third example of the adaptation of service in boundary cells also concerns handover. In this example, shown in FIG. 17, two UEs, UE311 and UE312, are being served by the same cell C31. The first UE, UE311, is using a service associated with a network slice NWS3, and the cell C31 is inside the coverage area of the network slice NWS2. Specifically, the cell C31 is a boundary cell of the network slice NWS3. The second UE, UE312, may not be associated with any network slice. However, the same situation applies if UE312 is using a service associated with a different network slice NWS4, and the cell C31 is inside the coverage area of the network slice NWS4 and is a non-boundary cell of the network slice NWS4.

If the load conditions in the cell C31 require a handover, UE311 and UE312 are both potential handover candidates, and for the purposes of this example it is assumed that the target cell in each case is a cell that is outside the coverage area of the network slice NWS3. Adapted policies are applied to determine which of the two UEs is to be handed over from the cell C31. Referring to FIG. 14, it is a policy 144, applying to network slices for which that cell is not a boundary cell, that is applied to UE 312, regardless of whether UE312 is not associated with any network slice or whether UE312 is using a service associated with the network slice NWS4, and the cell C31 is a non-boundary cell of the network slice NWS4. Again, referring to FIG. 14, it is a policy 142, applying to network slices for which that cell is a boundary cell, that is applied to UE311. Typically, the result will be that UE311 will not be handed over to the cell outside the coverage area of the network slice, while UE312 may be handed over.

Thus, in these examples, determining which cells form part of the coverage border of a network slice enables policies such as admission, congestion and mobility policies and control mechanisms to be optimized in a specialized manner for this cell type in order to secure Service Level Agreement (SLA) compliance for all slices and their associated services within the required coverage area.

Furthermore, where the record of border cells of a network slice has been updated following a change in the cells active in the network, these above described optimizations will be based on a near real time record of border cells of the network. Thus, the optimizations will be based on a record of border cells of network slices, where said record is more accurate. An additional advantage is that the SLA coverage aspects of the services (for the lifetime of said services) will have an increased possibility of being achieved at network slice borders. Additionally, as the record of border cells of network slices is updated as a result of changes in the cells active in the network, the network itself is configured in a flexible and optimal way for all the services which it is supporting. This is in-line with self-learning requirements for 5G.

It will be appreciated that while this disclosure focuses on one specific cell radio aspect, namely network slices, the methods described herein may be applicable to any logical entity within an operator network which represents a restricted radio coverage area, using any radio access technology. For example, the logical entities "NRCellCU", "NRCellDU" and "NRSectorCarrier", as defined in 3GPP TS 28.541, may equally comprise a record representing a restricted coverage area (which is established when the NW Slices are instantiated), and this record may be subsequently maintained using methods that are substantially similar to the methods that have been described above. Therefore, when references are made herein to network slices, the term "network slice" should be interpreted to cover any logical entity representative of a restricted radio coverage area.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, and in particular a tangible computer readable medium, or it could, for example, be in the form of a signal such as a downloadable data signal provided from an Internet website, or it could be in any other form.

In certain embodiments, a network node can be considered as comprising: a maintaining module, maintaining a record of border cells of network slices; a determining module, for determining a change in the cells active in the network; and an updating module, for updating said record of border cells of network slices based on said change in the cells active in the network.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of monitoring cells in a cellular communication network, the method comprising:
maintaining, in a memory, a record of border cells of at least one network slice within the cellular communication network;
determining, by a processor, a change in the cells active in the cellular communication network, wherein the change in the cells includes a cell being added to or removed from the cellular communication network;
based on the cell being added to or removed from the cellular communication network, identifying, by the processor, at least one neighbouring cell of said added or removed cell;
identifying, by the processor, whether each identified neighbouring cell of said added cell or removed cell are a border cell of the at least one network slice within the cellular communication network; and
updating, by the processor, said record of border cells of the at least one network slice based on said change in the cells active in the cellular communication network.

2. A method according to claim 1, wherein the step of determining the change in the cells active in the cellular communication network comprises receiving notification that the cell has been added to or removed from the cellular communication network.

3. A method according to claim 1, comprising,
when it is determined that the cell has been added to the cellular communication network:
identifying neighbours of said added cell;
identifying which of the identified neighbours of said added cell are border cells of at least one network slice;
identifying said at least one network slice; and
determining that said added cell is a border cell of said at least one network slice if not all neighbours of said added cell belong to the identified slice; and based on said determining,
performing the operation of updating.

4. A method according to claim 1, comprising,
when it is determined that the cell has been added to the cellular communication network:
identifying neighbours of said added cell;
comparing the identified neighbours of said added cell against a list of cells in the coverage area of said at least one network slice;
if one or more cell appearing among the identified neighbours does not appear in the list of cells in the coverage area of said at least one network slice, determining that said added cell defines at least a part of a boundary of the coverage area of said at least one network slice; and based on said determining,
performing the operation of updating.

5. A method according to claim 1, comprising,
when it is determined that the cell has been added to the cellular communication network:
identifying neighbours of said added cell;
identifying which of the identified neighbours of said added cell are border cells of at least one network slice;
identifying said at least one network slice; and identifying border cells of said at least one network slice, wherein the step of identifying border cells of said at least one network slice comprises, for a plurality of cells in a coverage area of said at least one network slice:

comparing a neighbour cell list of said added cell against a list of cells in the coverage area of said at least one network slice;

if one or more cell appearing in said neighbour cell list does not appear in the list of cells in the coverage area of said at least one network slice, determining that said added cell defines at least a part of a boundary of the coverage area of said at least one network slice; and based on said determining, performing the operation of updating.

6. A method according to claim 1, comprising, when it is determined that the cell has been removed from the cellular communication network:

identifying neighbours of said removed cell;

identifying which of the identified neighbours of said removed cell are border cells of at least one network slice;

identifying said at least one network slice; and determining that said removed cell was a border cell of said at least one network slice if not all neighbours of said removed cell belong to the identified slice; and based on said determining, performing the operation of updating.

7. A method according to claim 1, comprising, when it is determined that the cell has been removed from the cellular communication network:

identifying neighbours of said removed cell;

comparing the identified neighbours of said added cell against a list of cells in the coverage area of said at least one network slice;

if one or more cell appearing among the identified neighbours does not appear in the list of cells in the coverage area of said at least one network slice, determining that said removed cell defined at least a part of a boundary of the coverage area of said at least one network slice; and based on said determining, performing the operation of updating.

8. A method according to claim 1, comprising, when it is determined that the cell has been removed from the cellular communication network:

identifying neighbours of said removed cell;

identifying which of the identified neighbours of said removed cell are border cells of at least one network slice;

identifying said at least one network slice; and identifying border cells of said at least one network slice, wherein the step of identifying border cells of said at least one network slice comprises, for a plurality of cells in a coverage area of said at least one network slice:

comparing a neighbour cell list of said removed cell against a list of cells in the coverage area of said at least one network slice;

if one or more cell appearing in said neighbour cell list does not appear in the list of cells in the coverage area of said at least one network slice, determining that said removed cell defined at least a part of a boundary of the coverage area of said at least one network slice; and based on said determining, performing the operation of updating.

9. A network node for a cellular communication network, the network node comprising a processor and a memory, the memory containing instructions executable by the processor, wherein the memory is operative to:

maintain a record of border cells of at least one network slice within a cellular communication network; and wherein the processor is operative to:

determine a change in the cells active in the cellular communication network, wherein the change in the cells includes a cell being added to or removed from the cellular communication network;

identify whether each identified neighbouring cell of said added cell or removed cell are a border cell of the at least one network slice within the cellular communication network; and update said record of border cells of at least one network slice based on said change in the cells active in the cellular communication network.

10. A network node according to claim 9, wherein the processor is operative to determine the change in the cells active in the cellular communication network by receiving notification that the cell has been added to or removed from the network.

11. A network node according to claim 9, wherein the processor is operative to:

when it is determined that the cell has been added to the cellular communication network:

identify neighbours of said added cell;

identify which of the identified neighbours of said added cell are border cells of at least one network slice;

identify said at least one network slice; and determine that said added cell is a border cell of said at least one network slice if not all neighbours of said added cell belong to the identified slice; and based on said determining, perform the operation of updating.

12. A network node according to claim 9, wherein the processor is operative to:

when it is determined that the cell has been added to the cellular communication network:

identify neighbours of said added cell;

compare the identified neighbours of said added cell against a list of cells in the coverage area of said at least one network slice;

if one or more cell appearing among the identified neighbours does not appear in the list of cells in the coverage area of said at least one network slice, determine that said added cell defines at least a part of a boundary of the coverage area of said at least one network slice;

and based on said determining, perform the operation of updating.

13. A network node according to claim 9, wherein the processor is operative to:

when it is determined that the cell has been added to the cellular communication network:

identify neighbours of said cell;

identify which of the identified neighbours of said cell are border cells of at least one network slice;

identify said at least one network slice; and identify border cells of said at least one network slice by comparing a neighbour cell list of said cell against a list of cells in the coverage area of said at least one network slice; and if one or more cell appearing in said neighbour cell list does not appear in the list of cells in the coverage area of said at least one network slice, determine that said cell defines at least a part of a boundary of the coverage area of said at least one network slice; and based on said determining, perform the operation of updating.

14. A network node according to claim 9, wherein the processor is operative to:

when it is determined that the cell has been removed from the cellular communication network:

identify neighbours of said removed cell;

identify which of the identified neighbours of said removed cell are border cells of at least one network slice;

identify said at least one network slice; and determine that said removed cell was a border cell of said at least one network slice if not all neighbours of said removed cell belong to the identified slice; and based on said determining, perform the operation of updating.

15. A network node according to claim 9, wherein the processor is operative to:

when it is determined that the cell has been removed from the cellular communication network:

identify neighbours of said removed cell;

compare the identified neighbours of said added cell against a list of cells in the coverage area of said at least one network slice;

if one or more cell appearing among the identified neighbours does not appear in the list of cells in the coverage area of said at least one network slice, determine that said removed cell defined at least a part of a boundary of the coverage area of said at least one network slice; and based on said determining, perform the operation of updating.

16. A network node according to claim 9, wherein the processor is operative to:

when it is determined that the cell has been removed from the cellular communication network:

identify neighbours of said cell;

identify which of the identified neighbours of said cell are border cells of at least one network slice;

identify said at least one network slice; and identify border cells of said at least one network slice by comparing a neighbour cell list of said cell against a list of cells in the coverage area of said at least one network slice; and if one or more cell appearing in said neighbour cell list does not appear in the list of cells in the coverage area of said at least one network slice, determine that said cell defined at least a part of a boundary of the coverage area of said at least one network slice; and based on said determining, perform the operation of updating.

17. A non-transitory computer readable medium containing computer readable instructions that when executed cause a processor to perform a method comprising:

maintain a record of border cells of at least one network slice;

determine a change in the cells active in a cellular communication network, wherein the change in the cells includes a cell being added to or removed from the cellular communication network;

based on the cell being added to or removed from the cellular communication network, identify at least one neighbouring cell of said added or removed cell;

identify whether each identified neighbouring cell of said added cell or removed cell are a border cell of the at least one network slice within the cellular communication network; and update said record of border cells of at least one network slice based on said change in the cells active in the cellular communication network.

* * * * *